United States Patent
Kazui et al.

(10) Patent No.: US 9,078,000 B2
(45) Date of Patent: Jul. 7, 2015

(54) MOVING IMAGE DECODING APPARATUS, MOVING IMAGE ENCODING APPARATUS, MOVING IMAGE DECODING METHOD AND MOVING IMAGE ENCODING METHOD

(71) Applicant: FUJITSU LIMITED, Kawasaki-shi (JP)

(72) Inventors: Kimihiko Kazui, Kawasaki (JP); Satoshi Shimada, Kawasaki (JP); Junpei Koyama, Shibuya (JP)

(73) Assignee: FUJITSU LIMITED, Kawasaki (JP)

( * ) Notice: Subject to any disclaimer, the term of this patent is extended or adjusted under 35 U.S.C. 154(b) by 512 days.

(21) Appl. No.: 13/651,862

(22) Filed: Oct. 15, 2012

(65) Prior Publication Data

US 2013/0107941 A1    May 2, 2013

(30) Foreign Application Priority Data

Oct. 31, 2011    (JP) .................................. 2011-239454

(51) Int. Cl.
*H04N 7/28* (2006.01)
*H04N 19/44* (2014.01)
*H04N 19/176* (2014.01)
*H04N 19/129* (2014.01)
*H04N 19/86* (2014.01)

(52) U.S. Cl.
CPC ............. *H04N 19/44* (2014.11); *H04N 19/176* (2014.11); *H04N 19/129* (2014.11); *H04N 19/86* (2014.11)

(58) Field of Classification Search
CPC .................................................. H04N 19/176
See application file for complete search history.

(56) References Cited

U.S. PATENT DOCUMENTS

| | | | |
|---|---|---|---|
| 6,516,095 B1 * | 2/2003 | Kadono | 382/243 |
| 2003/0165194 A1 * | 9/2003 | Assaf | 375/240.16 |
| 2004/0008766 A1 * | 1/2004 | Wang et al. | 375/240.01 |

(Continued)

FOREIGN PATENT DOCUMENTS

| | | |
|---|---|---|
| EP | 0150935 A2 | 8/1985 |
| JP | 6-113286 A | 4/1994 |

(Continued)

OTHER PUBLICATIONS

JCTVC-F803, "WD4: Working Draft 4 of High-Efficiency Video Coding," Joint Collaborative Team on Video Coding of ITU-T SG16 WP3 and ISO/IEC JTC1/SC29/WG11 (Jul. 2011).

(Continued)

*Primary Examiner* — William C Vaughn, Jr.
*Assistant Examiner* — Luis Perez Fuentes
(74) *Attorney, Agent, or Firm* — Fujitsu Patent Center

(57) ABSTRACT

An apparatus decodes encoded moving image data in which a picture is divided and encoded, into two or more small areas that include at least a block and do not overlap with each other. The apparatus includes: a unit configured to decide first and second parameters being decoding parameters of another block for which decoding has already been performed in the same picture and referred to in an entropy decoding process and an extension process of each block, using position information of each small area and reference relation information to another small area; a decoder configured to perform the decoding process, in an order of the decoding process and the extension process, by referring only to the first parameter; and an extender configured to perform the extension process in the order by referring only to the second parameter in compression information of each block obtained by the decoding process.

12 Claims, 13 Drawing Sheets

(56) References Cited

U.S. PATENT DOCUMENTS

2005/0201470 A1* 9/2005 Sievers .................... 375/240.24
2010/0172412 A1* 7/2010 Shimada et al. ......... 375/240.12
2011/0026592 A1   2/2011 Sievers

FOREIGN PATENT DOCUMENTS

| JP | 6-101841 B2 | 12/1994 |
| JP | 2003-179938 A | 6/2003 |
| JP | 2005-260936 A | 9/2005 |
| WO | WO-2009/037726 A1 | 3/2009 |

OTHER PUBLICATIONS

JCTVC-F335, "Tiles," Joint Collaborative Team on Video Coding of ITU-T SG16 WP3 and ISO/IEC JTC1/SC29/WG11 (Jul. 2011).

* cited by examiner

FIG. 5

| | 311 | | 312 | | 313 | | 314 | | 315 |
|---|---|---|---|---|---|---|---|---|---|
| TBI | 2 | TBI | 2 | TBI | 2 | TBI | 2 | TBI | 0 |
| LSI | 0 | LSI | 0 | LSI | 0 | LSI | 0 | LSI | 0 |
| CWM1 | N/A | CWM1 | N/A | CWM1 | N/A | CWM1 | N/A | CWM1 | N/A |
| RHM1 | N/A | RHM1 | N/A | RHM1 | N/A | RHM1 | N/A | RHM1 | N/A |
| NCM1 | 1 | NCM1 | 1 | NCM1 | 1 | NCM1 | 0 | NCM1 | 0 |
| NRM1 | 0 | NRM1 | 0 | NRM1 | 0 | NRM1 | 4n | NRM1 | 0 |
| CW[0] | n | CW[0] | 2n | CW[0] | 3n | CW[0] | 4n | CW[0] | N/A |
| RH[0] | N/A | RH[0] | N/A | RH[0] | N/A | RH[0] | N/A | RH[0] | N/A |
| TID[0] | 0 | TID[0] | 0 | TID[0] | 0 | TID[0] | 0 | TID[0] | N/A |
| TID[1] | 1 | TID[1] | 1 | TID[1] | 1 | TID[1] | 1 | TID[1] | N/A |
| POI | 1 | POI | 1 | POI | 1 | POI | 1 | POI | N/A |

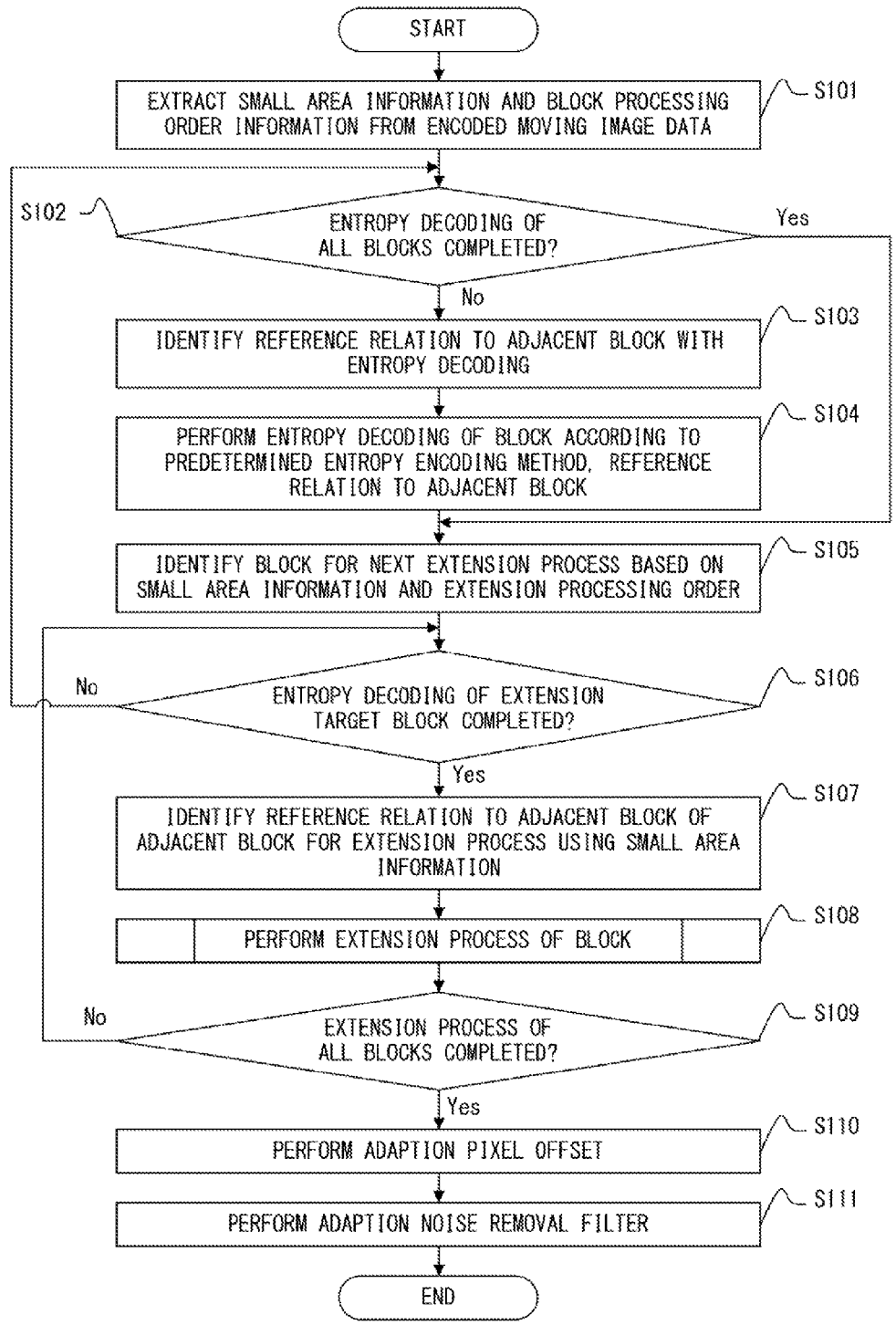
F I G. 9

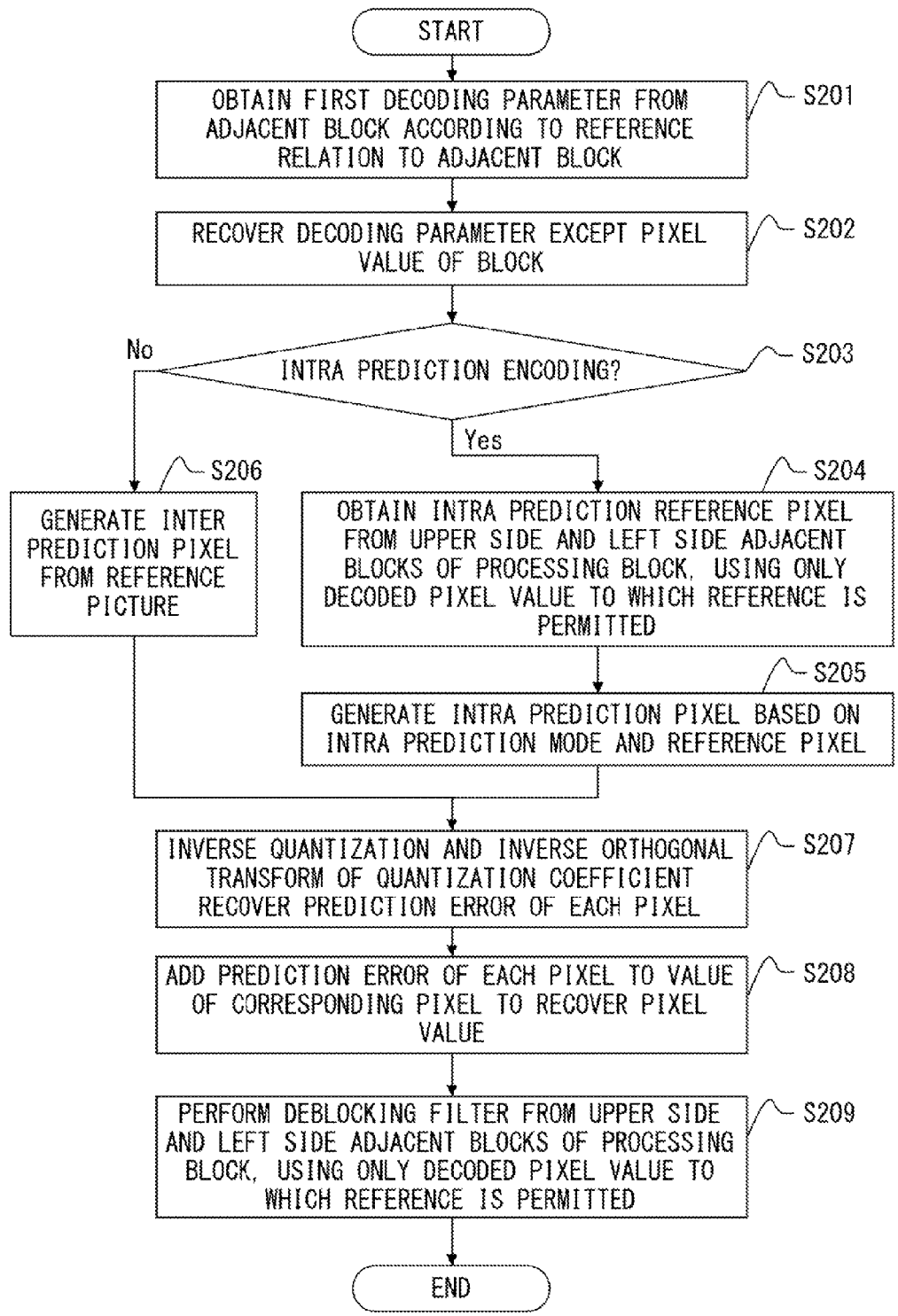
F I G. 10

MOVING IMAGE DECODING APPARATUS, MOVING IMAGE ENCODING APPARATUS, MOVING IMAGE DECODING METHOD AND MOVING IMAGE ENCODING METHOD

CROSS-REFERENCE TO RELATED APPLICATION

This application is based upon and claims the benefit of priority of the prior Japanese Patent Application No. 2011-239454, filed on Oct. 31, 2011, the entire contents of which are incorporated herein by reference.

FIELD

The embodiments discussed herein are related to an encoding technique of moving images and a decoding technique of encoded moving images.

BACKGROUND

Moving image data generally has a very large data amount. For this reason, in an apparatus handing moving image data, compression by encoding of moving image data is broadly performed when transmitting moving image data to another apparatus, or when storing moving imaged data in a storage apparatus. As typical moving image encoding standards, various techniques set by the International Standardization Organization/International Electrotechnical Commission (ISO/IEC) have been broadly used. These techniques include those called Moving Picture Experts Group phase 2 (MPEG-2), MPEG-4, or H.264 MPEG-4 Advanced Video Coding (MPEG-4 AVC/H.264).

In these encoding standards, an inter-encoding method to encode a picture being the encoding target using both the picture being the encoding target and its preceding/subsequent pictures, and an intra-encoding method to encode using only the information that the picture being the encoding target has.

In the inter-encoding method, a part with a high correlation between the encoding target picture and a reference picture is searched. Then, the inter-encoding method encode with a motion vector representing the difference in the position between the encoding target picture and the reference picture, and the difference (called a prediction error) between the pixel values between the pixels that the two pictures correspond. Generally, the correlation between pictures is high in moving images, and the value of the prediction error becomes smaller than the original picture value. As a result, the inter-encoding method has high compression efficiency.

However, in the inter-encoding method, an error generated in encoding a certain picture is carried to the encoding of a picture that is encoded later than the picture. For this reason, when encoding a plurality of successive pictures by the inter-encoding method, the picture quality deteriorates more in pictures that are encoded later. In addition, for a moving image decoding apparatus, for example, when a picture to be the reference is not obtained such as when encoded moving image data is obtained from halfway, an inter-encoded inter picture based on the picture to be the reference is not decoded in the normal way.

On the other hand, for an intra picture encoded in the intra-encoding method, the pixel value is decoded in the normal way without referring to the decoding result of another picture. Therefore, the intra-encoding method is used for encoding the first picture of moving image data, and for encoding a picture in the middle in a predetermined cycle. By making a picture in the halfway an intra picture, when the image decoding apparatus starts a decoding process from halfway of encoded moving image data, each picture after the intra picture is recovered in the normal way. Meanwhile, when the decoding operation starts from a certain picture, in a case in which the pixel value is decoded in the normal way for the picture or a picture after a predetermined time, the picture from which the decoding operation starts is called a refresh picture.

However, generally, the compression efficiency of the intra-encoding method is lower than that of the inter-encoding method. For this reason, in order to maintain the picture quality of the intra picture and the picture quality of the inter picture after decoding approximately equal, generally, it is desired to make the information amount of the intra picture larger than the information amount of the inter picture.

When an encoded moving image data is handled, an encoding delay is generated by encoding moving image data and decoding it. The encoding delay is the time from when the picture is input to the moving image encoding apparatus to when the picture is output from the moving image decoding apparatus. For example, in an application to transmit and recover moving image data in real time such as a remote television conference system, it is desirable to make the encoding delay small. In order for the user to use such an application without feeling the inconvenience, it is preferable that the encoding delay is about 100 milliseconds or less.

In order to make the encoding delay about 100 milliseconds or less, it is preferable to match the encoding order of pictures with the time order of the pictures, and to minimize buffering delay, one of the causes of the delay generated in transmitting and receiving encoded moving image data. The buffering delay is set to perform transmission of encoded moving image in which the information amount varies for each picture in a network having an approximately equal transmission speed as the average information amount per unit time of the encoded moving image. The buffering delay is the time use for transmitting a picture having the largest information amount in an encoded moving image stream, which is, for example, about several-frame time to 20-frame time.

Therefore, in order to minimize the buffering delay, it is preferable to make the information amount of each picture approximately constant. However, as mentioned earlier, when the picture quality of each picture after decoding is constant, the information amount of the intra picture becomes larger than the information amount of the inter picture. Therefore, in order to make the information amount of each picture constant, the picture quality of the intra picture significantly deteriorates when the information amount of the intra picture is simply made approximately equal to the information amount of the inter picture. Then, the picture quality of the inter picture whose reference picture is the intra picture also deteriorates significantly, and as a result, the picture quality of the whole moving image data deteriorates significantly.

As a method to make the information amount of each picture approximately constant without losing the picture quality significantly, the intra-slice method has been proposed. In the intra-slice method, pictures other than the first picture of moving image data being the encoding target do not become the intra picture, but instead, a macroblock group to be intra-encoded is inserted into each picture so as to circulate in the picture in a predetermined cycle. The macroblock group to be intra-encoded is called an intra slice. In addition, in this method, normal decoding is performed sequentially in the picture, and the method is also called a gradual refresh.

For example, when the circulation direction is the direction from the top to the bottom in a picture, the picture having the intra slice highest is the refresh picture, and normal pixel value recovery is performed sequentially from the topmost of the picture. Then, in the picture having the intra slice lowest, the pixel value of the whole picture is recovered in the normal way. The interval of the refresh pictures, that is, the refresh cycle is the same as the circulation cycle of the intra slice.

Meanwhile, each macroblock in the intra slice does not have to be intra-encoded. That is, when starting decoding from the refresh picture, it will do as long as each macroblock in the intra slice so that, it is assured that, when starting decoding from a refresh picture, the pixel value of pictures after the refresh picture is recovered in the normal way. For example, the macroblock in the intra slice may be inter-encoded using a motion vector that refers to an area in an area in which it is assured that the pixel value is recovered in the normal way (such an area is called a "clean area") in the picture.

However, when moving image data is encoded using the intra slice method, there is an area in which it is not assured that the pixel value is recovered in the normal way, in pictures before the picture refreshed by the intra slice. The area is called a "non-clean area". In order to assure that the pixel value in the clean area is recovered in the normal way when moving image data is encoded using the intra slice method, there is a restriction that the macroblock in the clean area does not refer to the information of the pixel in the non-clean area.

For example, when an encoding target macro block in the clean area is inter-encoded, it is desirable that the whole block in the reference picture referred to be the encoding target macroblock is included in the clean area.

In addition, in the MPEG-4 AVC/H.264 standard, in encoding the motion vector, the average (or median) value of the motion vector of the macroblock immediately above or left of the encoding target macroblock is calculated as a predicted value PMVMED of the motion vector. Then, the difference between the predicted value PMVMED and the motion vector of the encoding target macroblock is entropy-encoded.

Incidentally, a technique to divide the picture being the encoding target into rectangular small areas called a "tile" and to process each block has been proposed. In this technique called the picture division encoding method, in order to process the respective tiles in parallel, restriction to prohibit reference across the tile boundary is permitted. The entropy encoding of each block is processed sequentially in the scanning order in the tile, and reset at the top of the tile.

Meanwhile, techniques described in each of the following documents have been known.

Document 1: Japanese Laid-open Patent Publication No. 2003-179938

Document 2: Japanese Laid-open Patent Publication No. 06-113286

Document 3: Japanese Laid-open Patent Publication No. 2005-260936

Document 4: International Publication Pamphlet No. 2009/037726

Document 5: Japanese Examined Patent Application Publication No. 06-101841

Document 6: JCTVC-F803, "WD4: Working Draft 4 of High-Efficiency Video Coding", Joint Collaborative Team on Video Coding of ITU-T SG16 WP3 and ISO/IEC JTC1/SC29/WG11, July, 2011

Document 7: JCTVC-F335, "Tiles", Joint Collaborative Team on Video Coding of ITU-T SG16 WP3 and ISO/IEC JTC1/SC29/WG11, July, 2011

Incidentally, the picture division encoding method has the following two problems.

The first problem is the decrease in the encoding efficiency in the parallel processing of the compression process of each small area (the encoding process except entropy encoding).

In the existing picture division encoding method, absence/presence of the restriction of the reference across the small areas is applied to both the compression process and the entropy encoding at the same time. Furthermore, in the entropy encoding, reset is performed at the top of the small area. These restrictions for the entropy encoding is applied when encoding each small area in a completely separate manner, but does not need to be applied when processing only the entropy encoding by a single circuit, and application of these restrictions causes a decrease in the encoding efficiency.

Another problem is the delay in entropy encoding. This problem is explained using FIG. 1 and FIG. 2.

FIG. 1 schematically illustrates the structure in a case in which a boundary of two small areas is inserted into a picture, and represent the state in which two small areas 11 are inserted into a picture 10. Meanwhile, in FIG. 1, the processing order of the block in the existing picture division encoding method is expressed by the direction of an arrow 12.

When dividing the picture 10 into two left and right small areas 11 and sequentially processing the block in each small area in the scanning order as in FIG. 1, in order to start the entropy encoding of the small area 11 on the right in FIG. 1, it is desired that the entropy encoding of the small area 11 on the left is completed. Meanwhile, in order to complete the entropy encoding of the small area on the left, it is desired that at least the taking of the last line of the processed picture is completed. For this reason, a delay corresponding to one picture is generated.

As a method to solve the delay problem, a method to make the process order of each block the sequential scanning order by inserting the small area boundary between the respective block lines of the picture has been known. FIG. 2 schematically illustrates the structure in a case in which the small area boundary is inserted into the respective block lines of the picture, and represents the way in which a plurality of small areas 21 area inserted into a picture 20. Meanwhile, the height of the small area 21 is all "1". Meanwhile, in FIG. 2, the processing order of the block in the existing picture division encoding method is expressed by the direction of an arrow 22. However, in this method, since the number of the small areas 21 in the picture 20 increases, the encoding efficiency by the reset of the entropy encoding further decreases.

SUMMARY

According to an aspect of the embodiment, a moving image decoding apparatus decoding encoded moving image data in which a picture is divided and encoded, into two or more small areas that include at least a block and do not overlap with each other, the moving image decoding apparatus includes: a small area information extractor configured to extract small area information, from the encoded moving image data, small area information including position information of each small area and reference relation information to another small area; a block processing order information extractor configured to extract, from the encoded moving image data, block processing order information representing an order of an entropy decoding process of each block in the picture and an extension process of each block in the picture; a reference parameter decision unit configured to decide a decoding parameter of another block for which decoding has already been done in the same picture, being a first decoding parameter referred to when the entropy decoding process of each block in the picture is performed, and a decoding parameter of another block for which decoding has already been done in the same picture, being a second decoding parameter referred to when the extension process of each block in the picture is performed, using the small area information; an entropy decoder configured to generate compression information of each block in the picture by performing the entropy decoding process of each block in the picture, to the encoded moving image data, in an order according to the block processing order information, by referring only to the first decoding parameter; and a block extender configured to generate a decoding parameter of each block in the picture by performing the extension process of each block in the picture, to the encoded moving image data, in an order according to the block processing order information, by referring only to the second decoding parameter in the compression information of each block in the picture, wherein the block processing order information indicates, for each of the entropy decoding process and the extension processing, either one of a sequential scanning order in the picture and a sequential scanning order in the small area, and when the block processing order information indicates the sequential scanning order in the picture as the order of the entropy decoding process, in the entropy decoding process, a reset process on a small area boundary is not performed, and, a decoding parameter for a block in a different small area in the first parameter is referred to.

According to another aspect of the embodiment, a moving image encoding apparatus generating an encoded moving image data by dividing and encoding a picture into two or more small areas that that include at least a block and do not overlap with each other, the moving image encoding apparatus includes: a small area information decision unit configured to decide small area information including position information and reference relation information to another small area, the small area being inserted into the encoded moving image data; a block processing order information decision unit configured to decide block processing order information being information representing an order of an entropy encoding process of each block in the picture and a compression process of each block in the picture and being information inserted into the encoded moving image data; a reference parameter decision unit configured to decide, using the small area information, a local decoding parameter of another block for which entropy encoding has already been performed in the same picture being a first decoding parameter referred to when the entropy encoding process of each block in each picture is performed, and a local decoding parameter of another block for which local decoding has already been processed in the same picture being a second decoding parameter referred to when the compression process of each block in the picture is performed; a block compressor configured to generate compression information of each block in the picture by performing the compression process to each block in the picture in an order according to the block processing order information by referring only to the second decoding parameter; and an entropy encoder configured to generate an encoded data of each block in the picture by performing the entropy encoding process to the compression information of each block in the picture in an order according to the block processing order information by referring only to the first decoding parameter, wherein the block processing order information indicates, for each of the entropy encoding process and the compression process, either one of a sequential scanning order in the picture and a sequential scanning order in the small area, and when the block processing order information indicates the sequential scanning order in the picture as the order of the entropy encoding process, a reset process is not performed on a small area boundary in the entropy encoding process, and the decoding parameter of a different small area in the first parameter is referred to.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is an example of the data structure of position information of each small area in each picture and reference relation information to another small area, in encoded moving image data recovered by a moving image decoding apparatus according to an embodiment.

FIG. 9 is a flowchart (part 1) presenting the process detail of a moving image decoding process according to an embodiment.

FIG. 10 is a flowchart (part 2) presenting the process detail of a moving image decoding process according to an embodiment.

DESCRIPTION OF EMBODIMENTS

Preferred embodiments of the present invention will be explained with reference to accompanying drawings.

Hereinafter, with reference to the drawings, a moving image decoding apparatus of an embodiment is explained. The moving image decoding apparatus decodes encoded moving image data in which a picture is divided and encoded, into two or more small areas that include at least a block and do not overlap with each other.

Meanwhile, the picture may be either a frame or a field. A frame is a still image in moving image data, whereas a field is a still image obtained by taking out data of odd-numbered lines only, or data of even-numbered lines only.

In addition, the encoded moving image may be a color moving image, or may be a monochrome moving image.

Figure 1:
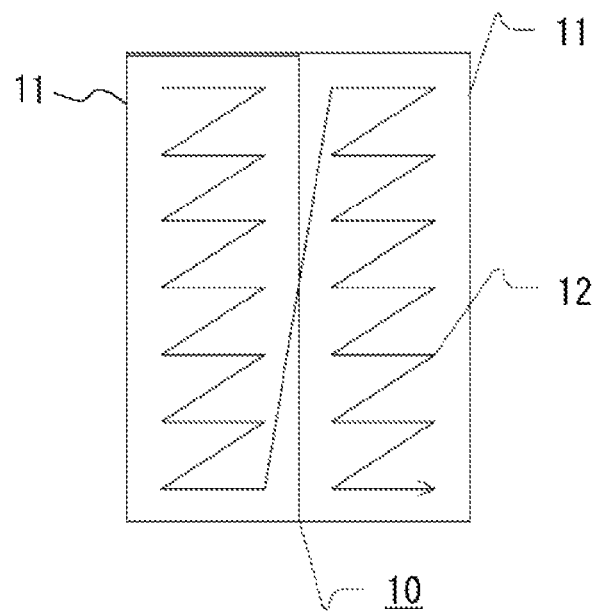
FIG. 1 is a diagram illustrating the processing order of the block in a case in which a picture is divided by two small areas, in the existing technique.
Figure 2:
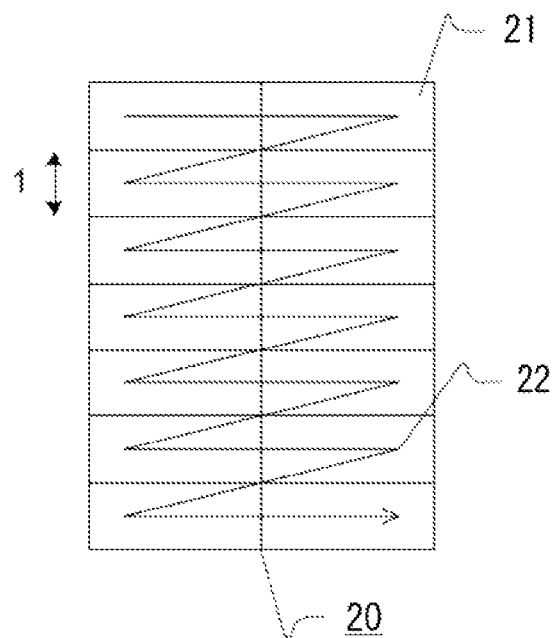
FIG. 2 is a diagram illustrating the processing order of the block in a case in which the small area boundary is inserted into each block line of a picture.
Figure 3:
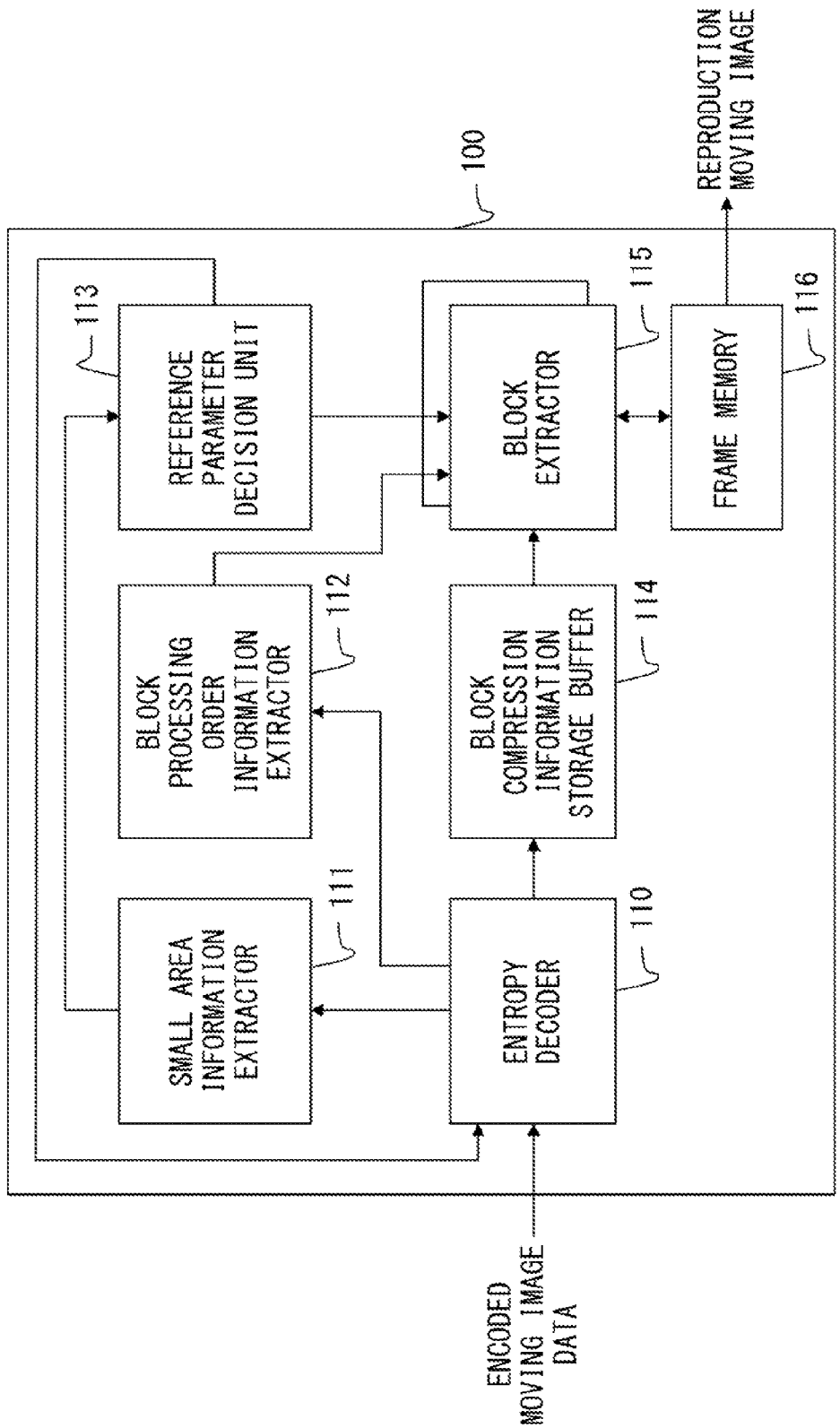
FIG. 3 is an outline configuration diagram of a moving image decoding apparatus according to an embodiment.

FIG. 3 is a schematic configuration diagram of a moving image decoding apparatus according to an embodiment.

A moving image decoding apparatus 100 receives an encoded moving image data as input, and outputs a decoded moving image. The moving image decoding apparatus 100 has an entropy decoder 110, a small area information extractor 111, a block processing order information extractor 112, a reference parameter decision unit 113, a block compression information storage buffer 114, a block extender 115, and a frame memory.

Each of these elements that the moving image decoding apparatus 100 has is respectively formed as a separate circuit. Alternatively, each of these elements may be implemented on the moving image decoding apparatus 100 as an integrated circuit on which the circuits corresponding to each of the elements. Furthermore each of these elements that the moving image decoding apparatus 100 has may be a functional module realized by a computer program executed on a processor that the image decoding apparatus 100 has.

The moving image decoding apparatus 100 obtains a data stream including encoded moving image data via, for example, a communication network (not illustrated in the drawing) and an interface circuit (not illustrated in the drawing) to connect the moving image decoding apparatus 100 to the communication networks. The moving image decoding apparatus 100 takes out encoded moving image from the obtained data stream, and makes a buffer memory that is not illustrated in the drawing store it. After that, the moving image decoding apparatus 100 reads out the encoded moving image data in predetermined units (for example, every plurality of blocks, or every picture) from the buffer memory, and inputs the read data to the entropy decoder 110.

The entropy decoder 110 decodes data such as block data encoded according to a predetermined entropy encoding method, from the encoded moving image data. In addition, the entropy decoder 110 recovers compression information of the block, and outputs the recovered compression information to the block compression information storage buffer 114. Meanwhile, as the predetermined entropy encoding method, for example, the Huffman encoding method or an arithmetic encoding method (for example, CABAC: Context-based Adaptive Binary Arithmetic Coding) may be used.

In addition, the entropy decoder 110 receives information of the first decoding parameter to refer to, from the reference parameter decision unit 113. At the time of entropy decoding of the block data, the entropy decoder 110 performs the entropy decoding using only the corresponding decoding parameter for another block adjacent to the decoding target block.

Furthermore, the entropy decoder 110 takes out, from the encoded moving image data, block processing order information and small area information added in units of pictures. The entropy decoder 110 outputs the taken-out small area information to the small area information extractor 111, and also outputs the taken-out block processing order information to the block processing order information extractor 112.

The small area information extractor 111 recovers position information of each small area in the decoding target picture and reference relation information to another small area (adjacent another small area) adjacent to each small area, based on the small area information received from the entropy decoder 110. The recovered position information of each small area (first small area information) and the recovered reference relation information to adjacent another small area (second small area information) are output from the small area information extractor 111 to the reference parameter decision unit 113. Details of the two types of small area information area described later.

The block processing order information extractor 112 decides the entropy decoding order for each block and the extension processing order for each block, based on the block processing order information received from the entropy decoder 110. The information of the extension processing order it output from the block processing order information extractor 112 to the block extender 115.

The reference parameter decision unit 113 decides the first decoding parameter and the second encoding parameter, based on the small area information received from the small area information extractor 111. Meanwhile, the first decoding parameter is a decoding parameter of adjacent another block referred to for the entropy decoding process of each block. In addition, the second decoding parameter is a decoding parameter of adjacent another block referred to for the extension process of each block. The decided first decoding parameter and the second decoding parameter are output from reference parameter decision unit 113 to the entropy decoder 110 and the block extender 115, respectively.

The block compression information storage buffer 114 is used when the entropy decoding process of each block in the entropy decoder 110 and the extension process of each block in the block extender 115 are not in synchronization. Such a case includes, for example, when the value of ProcessingOrderIdx described later is "1". In this case, the block compression information storage buffer 114, buffers and temporarily stores compression information of the block for which entropy encoding is performed earlier.

The block extender 115 performs the extension process of one or more blocks. The moving image decoding apparatus 100 has one or more units of the block extender 115.

While the block extender 115 has a prediction error pixel recovering circuit, a prediction pixel generation circuit, a decoded pixel generation circuit, and an in-loop post filter circuit, these circuits are not particularly illustrated in the drawing. Meanwhile, the prediction error pixel recovering circuit is a circuit that recovers a prediction error pixel by performing inverse quantization and inverse orthogonal transform for a quantized DCT coefficient in the block compression information. Meanwhile, the prediction pixel generation circuit is a circuit that generates an intra prediction pixel or inter prediction pixel from a decoded pixel stored in the frame memory. In addition, the decoded pixel generation circuit is a circuit that generates a decoded pixel by adding the prediction error pixel and the prediction pixel. Then, the in-loop post filter circuit is a circuit that generates the final decoded pixel by three in-loop post filters, that is, a deblocking filter, a adaptive pixel offset, and an adaptive noise removal filter sequentially. Meanwhile, the decoded pixel immediately after adding the prediction error pixel and the prediction pixel, and the final decoded pixel are output from the block extender 115 to the frame memory.

Meanwhile, the order of the extension process of each block performed by the block extender 115 is switched based on the information of the extension processing order received from the block processing order information extractor 112.

The frame memory receives and stores the decoded image immediately after adding the prediction error pixel and the prediction pixel, and the final decoded pixel to which the three types of post filters are applied, from the block extender 115.

After that, the frame memory outputs, at a display timing decided separately, the final decoded pixel as a reproduced moving image. In addition, the frame memory also performs output of the decoded image immediately after adding the prediction error pixel and the prediction pixel, and the final decoded pixel to which the three types of post filters are applied to the block extender 115.

Figure 4:
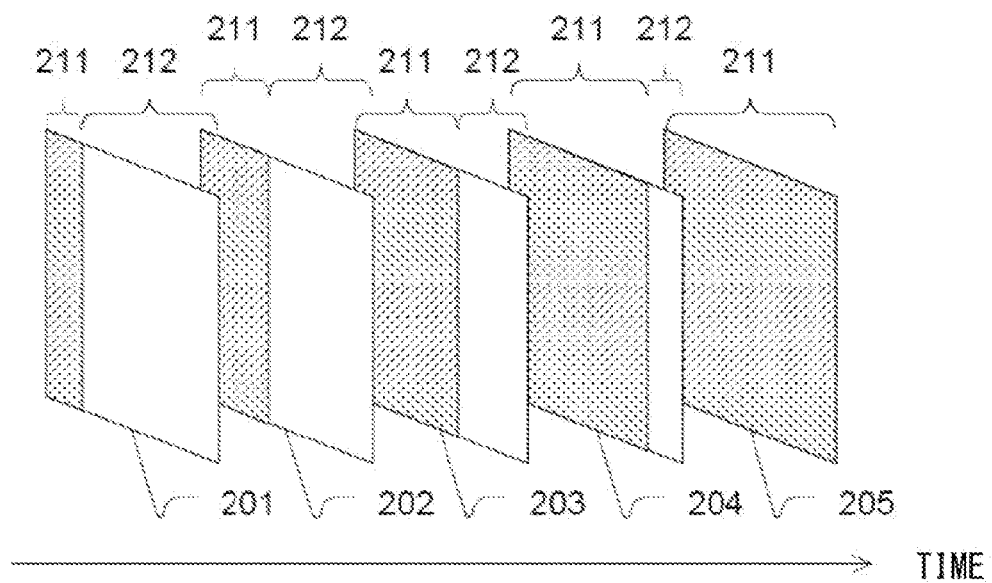
FIG. 4 is a diagram illustrating an example of the way in which the small area boundary is moved in each picture by inserting one or two small areas into each picture.

Next, information of small areas described in encoded moving image data reproduced by the moving image decoding apparatus 100 according to an embodiment is explained using FIG. 4 and FIG. 5.

FIG. 4 illustrates an example of the way in which one or two small areas are inserted into each picture and the small area boundary is moved in each picture, which illustrates a case in which encoding is performed so that the clean area occupies the entire picture in a predetermined cycle. In FIG. 4, a clean area 211 and a non-clean area 212 are indicated in each of pictures 201, 202, 203, 204, and 205. Meanwhile, in the example of FIG. 4, the boundary between the clean area 211 and the non-clean area 212 moves from left to right according to the passage of time.

FIG. 5 illustrates an example of the data structure and value of position information (first small area information) of each small area in each picture, and reference relation information (second small area information) to another small area, described in encoded moving image data reproduced by the moving image decoding apparatus according to an embodiment.

Meanwhile, the data value of each of data 311, 312, 313, 314, and 315 illustrated in FIG. 5 is described information about the pictures 201, 202, 203, 204, and 205 in FIG. 4.

The small area information is described in one or both of SPS (Sequence Parameter Set) or PPS (Picture Parameter Set), in the encoding method described in Document 6 mentioned above.

In the two column, 11 lines matrix of the data 311-315 in FIG. 5, the left column is the type of data described in abbreviation, and the right column is the value of data. Here, the data value described as "N/A" means that the value is not referred to. The proper name and meaning of each of the data types described in abbreviation in the left column are as follows.

TBII (TileBoundaryIndependenceIdr.) is an index indicating the reference relationship of each small area, and is an example of dependency information indicating the dependency of a block regarding the first decoding parameter and the second decoding parameter. The value being "0" indicates "the presence of dependency" for the decoding parameter, that is, it means that the reference to all the small areas adjacent to itself is valid in the entropy decoding process and the extension process. Meanwhile, the value being "1" indicates "the absence of bidirectional dependency" of the decoding parameter, that is, it means that the reference to all the small areas adjacent to it is valid in the entropy decoding process and the extension process. Then, the value being "2" indicates "the presence of one direction dependency". This means that in the extension process, reference to a small area whose priority is lower than itself is invalid, and in the entropy decoding process, all the small areas adjacent to itself if valid. When the order of entropy decoding is the sequential scanning order in the screen, TileBoundaryIndependenceIdr is set to "2".

USI (UniformSpacingIdr.) is an index indicating whether the widths and the heights of the respective small areas are equal. The value being "0" indicates that the widths or the heights of the respective small areas are not equal. Meanwhile, the value being "1" indicates that the widths or the heights of the respective small areas are equal.

CWM1 (ColumnWidthMinus1.) represents the width (in units of blocks) of each small area. The index is encoded when the value of UniformSpacingIdr is "1". Meanwhile, assuming the width of the picture as W (in units of blocks), the number of small areas in the lateral direction is (W/(ColumnWidthMinus1+1)).

RHM1 (RowHeightMinus1.) represents the height (in units of blocks) of each small area. The index is encoded when the value of UniformSpacingIdr is "1". Meanwhile, assuming the height of the picture as H (in units of blocks), the number of small areas in the longitudinal direction is (H/(RowHeightMinus1+1)).

NCM1 (NumColumnsMinus1.) represents the number of small areas in the lateral direction. The index is encoded when the value of UniformSpacingIdr is "0". Meanwhile, the actual number of small areas in the lateral direction is (NumColumnsMinus1+1).

NRM1 (NumRowsMinus1.) represents the number of small areas in the longitudinal direction. The index is encoded when the value of UniformSpacingIdr is "0". Meanwhile, the actual number of small areas in the longitudinal direction is (NumRowsMinus1+1).

CW[x] (ColumnWidth.) is the width of the x-th small area counted from the left. The index is encoded when the value of NumColumsMinus1 is "1" or more.

RH[x] (RowHeight.) is the height of the x-th small area counted from the top. The index is encoded when the value of NumRowsMinus1 is "1" or more.

TID[x] (TileIdxDiff.) is a priority difference of the x-th small area in the sequential scanning order in the picture.

The index is described only when the value of TileBoundaryIndependenceIdr is "2". The priority TileIndex of each small area is determined from this TileIdxDiff. More specifically, when x is "0", TID[0] is the priority of the 0-th small area, and when x is "1" or more, (TID[n−1]+TID[n]) is the priority of the x-th small area. Meanwhile, the priority is in the descending order. Therefore, TileIndex=0 has the highest priority, and the priority decreases as the value increases. Meanwhile, when the value of TileBoundaryIndependenceIdr is other than "2", the value of TileIdxDiff of all the small areas is "0". This TileIdxDiff is an example priority information that represents the priority among the respective blocks.

POI (ProcessingOrderIdx.) is an index indicating the processing order. The index is described only when the value of TileBoundaryIndependenceIdr is "2". When the value is "0", the processing order of both the entropy decoding and the extension process is the sequential scanning order in the small area. Meanwhile, the sequential scanning order in the picture becomes the processing order of each small area. Meanwhile, when the value is "1", the entropy decoding process is in the sequential scanning order in the picture, and the extension process is the sequential scanning order in the small area. Meanwhile, when the value of TileBoundaryIndependenceIdr is other than "2", the value of ProcessingOrderIdx is "0". When the value of TileBoundaryIndependenceIdr is "0" or "2", the entropy encoding is not reset at the small area boundary. On the other hand, when the value of TileBoundaryIndependenceIdr is "1", the entropy encoding is reset at the small area boundary.

In the respective data types above, ProcessingOrderIdx is an example of block processing order information, and other data types are an example of small area information.

In the example in FIG. 4, in each of the pictures 201-204, the priority TileIndex of the small area on the left corresponding to the clean area 211 is set higher than the priory TileIndex of the small area on the right of the picture corresponding to the non-clean area 212. Accordingly, the small area on the left in each of the pictures 201-204 is decoded without referring to the decoding parameter for the small area on its right side for which normal decoding is not assured. Therefore, it becomes possible to decode all pixels in the normal way at the last picture in the refresh cycle.

Meanwhile, data 315 in FIG. 5 differs from other data 311-314, and its value of each of TileBoundaryIndependenceIdr, NumColumnsMinus1, and NumRowsMinus1 is all "0". This is because, the picture 205 corresponding to the data 315 is a picture in which the entirety of the picture 205 becomes the clean area 211, and such a picture does not need the reference restriction.

Figure 6:
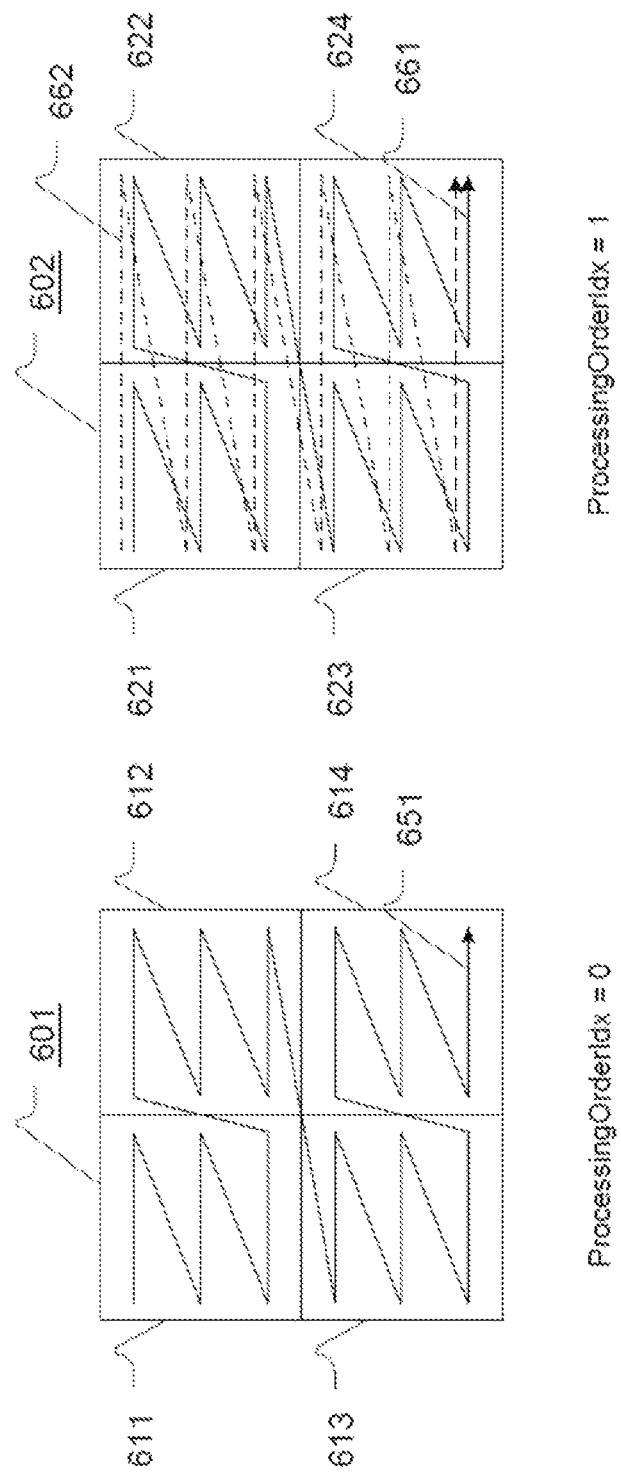
FIG. 6 is an illustration diagram of the decoding order and the extension processing order of each block, according to an embodiment.

Next, the decoding order and the extension processing order of the respective blocks are explained using FIG. 6.

In FIG. 6, a picture 601 is divided into four small areas 611, 612, 613, and 614, and a picture 602 is also divided into four small areas 621, 622, 623, and 624.

An arrow 651 drawn on the picture 601 represents the entropy decoding processing order and the extension processing order of the blocks in the case in which the value of ProcessingOrderIdx is "0". That is, each of the small areas 611-614 is processed in the sequential scanning order in the picture 601, and each block in the small areas 611-614 is processed in the sequential preprocess order in the small areas 611-614.

Meanwhile, a solid line 611 drawn on the picture 602 represents the extension processing order of blocks in the case in which the value of ProcessingOrderIdx is "1". Then, a broken line arrow 622 is the processing order of the entropy decoding of the blocks, in the case in which the value of ProcessingOrderIdx is "1". Thus, the entropy decoding processing is the sequential scanning order in the picture regardless of the position and number of the small areas.

Meanwhile, when the number of the small area is "1", the entropy decoding processing order and the extension processing order of the respective blocks are the same as the sequential scanning order in the picture.

Next, the reference relation of the decoding parameters (first decoding parameter) of adjacent another block in the entropy decoding process is explained below.

The decoding parameters of adjacent another block referred to in the entropy decoding process are SkipFlag and SplitFlag in the case of the encoding process described in Document 6 mentioned above. Here, SkipFlag is a flag indicating that the block has no valid coefficient, and motion vector information is not transmitted explicitly in the encoding mode. Meanwhile, SplitFlag is a flag indicating whether or not the block is divided hierarchically in the quadtree structure. These flags do not have dependency relation between pictures.

Meanwhile, when the entropy decoding method is CABAC mentioned above, the flags of adjacent another block are used for context calculation of the flags of the entropy decoding process block. For example, when both the SkipFlag of the left adjacent block and the SkipFlag of the right adjacent block are both 1, the context of the number "(1<<1)+1=3" is used. By restoring the context properly, the CABAC decoding is performed in the normal way.

In this embodiment, the reference relation of the decoding parameters (first decoding parameter) is set as [1-1] to [1-4] below.

[1-1] When the block being the entropy decoding processing target is on the leftmost, reference to the left adjacent block is restricted.

[1-2] When the block being the entropy decoding processing target is on the top, reference to the upper adjacent block is restricted.

[1-3] When the block being the entropy decoding processing target and its adjacent blocks (upper and left) are in the same small area, reference to their decoding parameters is permitted, regardless of the value of TileBoundaryIndependenceIdr.

[1-4] When the block being the entropy decoding processing target and its adjacent blocks (upper and left) are in different small areas, permission/restriction of reference is determined as follows, depending on the value of TileBoundaryIndependenceIdr. That is, when the value of TileBoundaryIndependenceIdr is "0" or "2", reference to the decoding parameter is permitted. On the other hand, when the value of TileBoundaryIndependenceIdr is "1", reference to the decoding parameter is restricted.

Meanwhile, in the entropy decoding process, the rest of the entropy decoding process across small areas is as [2-1] and [2-2] below depending on the value of TileBoundaryIndependenceIdr. Meanwhile, the rest consists of initialization of each CABAC context and a byte align process, and the reset is performed at the picture top.

[2-1] When the value of TileBoundaryIndependenceIdr is "0" or "2", reset is not performed.

[2-2] Perform reset when the value of TileBoundaryIndependenceId is "1".

According to above, when the value of TileBoundaryIndependenceIdr is "1", the entropy decoding process of each small area is processed independently. Therefore, when the decoding apparatus is configured to have a plurality of entropy decoding sections, the entropy decoding process is performed in parallel.

Next, the reference relation of the decoding parameters (second decoding parameters) of adjacent another block in the extension process according to an embodiment is explained below. Meanwhile, this explanation is applied except for the deblocking filter.

The decoding parameters of adjacent another block are, in the case of the encoding method in Document 6 mentioned above, motion vector information, intra prediction direction information, quantization scale information, the decoded pixel value of the decoded pixel value (before application of each post filter). In these decoding parameters, for the motion vector information and the decoded pixel value, the incorrect value may be decoded when decoding is started from the refresh picture. This is because, for these decoding parameters, the prediction process in the time direction is performed to recover. Hereinafter, these decoding parameters in the second decoding parameters referred to in the extension process are especially called the "first parameter group".

Meanwhile, the intra prediction direction information and the quantization scale information is a decoding parameter for which the correct value is decoded even when the decoding is started from the refresh picture. Hereinafter, these decoding parameter in the second decoding parameters are especially called the "second parameter group". In the recovery of the second parameter group, the prediction process in the time direction is not performed.

In this embodiment, the reference relation of the decoding parameter (second decoding parameter) of adjacent another block in the extension process is determined as [3-1] to [3-4] below.

[3-1] When the block being the extension processing target is on the leftmost, reference to the decoding parameter of the left adjacent block is restricted.

[3-2] When the block being the extension processing target is on the top, reference to the decoding parameter of the upper adjacent block is restricted.

[3-3] When the block being the extension processing target and its adjacent blocks (upper and left) are in the same small area, reference to all parameters is permitted, regardless of the value of the TileBoundaryIndependenceIdr.

[3-4] When the block being the extension processing target and its adjacent blocks (upper and left) are indifferent small areas, permission/restriction of reference is determined as follows, depending on the value of TileBoundaryIndependenceIdr.

First, when the value of TileBoundaryIndependenceIdr is "0", reference to all the decoding parameters is permitted.

Next, when the value of TileBoundaryIndependenceIdr is "2", further, permission/restriction of reference is determined as follows. That is, when the priority TileIndexCurr of the small area including the extension processing target block is higher than the priority TileIndexRef of the small area including the adjacent block, reference to the second parameter group is permitted. Meanwhile, when the priority TileIndexCurr of the small area including the extension processing target block is equal to or lower than the priority TileIndexRef of the small area including the adjacent block, reference to both the first parameter and the second parameter group is permitted.

On the other hand, when the value of TileBoundaryIndependenceIdr is "1", reference to both the first parameter group and the second parameter group is prohibited.

Next, the operation when reference to the decoding parameters of adjacent another block is prohibited, according to an embodiment is explained. Meanwhile, the explanation is applied except for the deblocking filter.

When reference to the moving vector information is prohibited, the extension processing target block is treated in the same manner as the extension processing target block in a case in which the corresponding block is outside the picture. That is, the extension processing target block is treated as not having the motion vector information.

When reference to the intra prediction direction information is prohibited, the extension processing target block is treated in the same manner as the extension processing target block in a case in which the corresponding block is outside the picture. For example, in the case of the encoding method described in Document 6, the intra prediction direction becomes the DC mode.

When reference to the quantization scale information is prohibited, the extension processing target block is treated in the same manner as the extension processing target block in a case in which the corresponding block is outside the picture. That is, the extension processing target block is treated as not having quantization scale information.

The decoded pixel value before application of the post filter is referred to in the intra prediction. When reference to the decoded pixel value is prohibited, the extension processing target block is treated as being in another slice. For example, in the case of the encoding method described in Document 6, a copy of the value of the pixel in the same small area in the extension processing target block, closest from the reference pixel, is used for intra prediction as the decoded pixel value.

In the decoded pixel value after application of the post filter, the decoded pixel value after the developing filter is referred to be adaptive pixel offset, and the decoded pixel value after the adaptice pixel offset is referred to by the adaptice noise removal filter. Here, when reference to the decoded pixel value after application of the post filter is prohibited, the process is performed regarding the small area boundary as the picture boundary. For example, in the case of the encoding method described in Document 6, a copy of the value of the pixel in the same small area in the extension processing target block, closest from the reference pixel, is used for the adaptive pixel offset and the adaptive noise removal filter, as the decoded pixel value.

Figure 7:
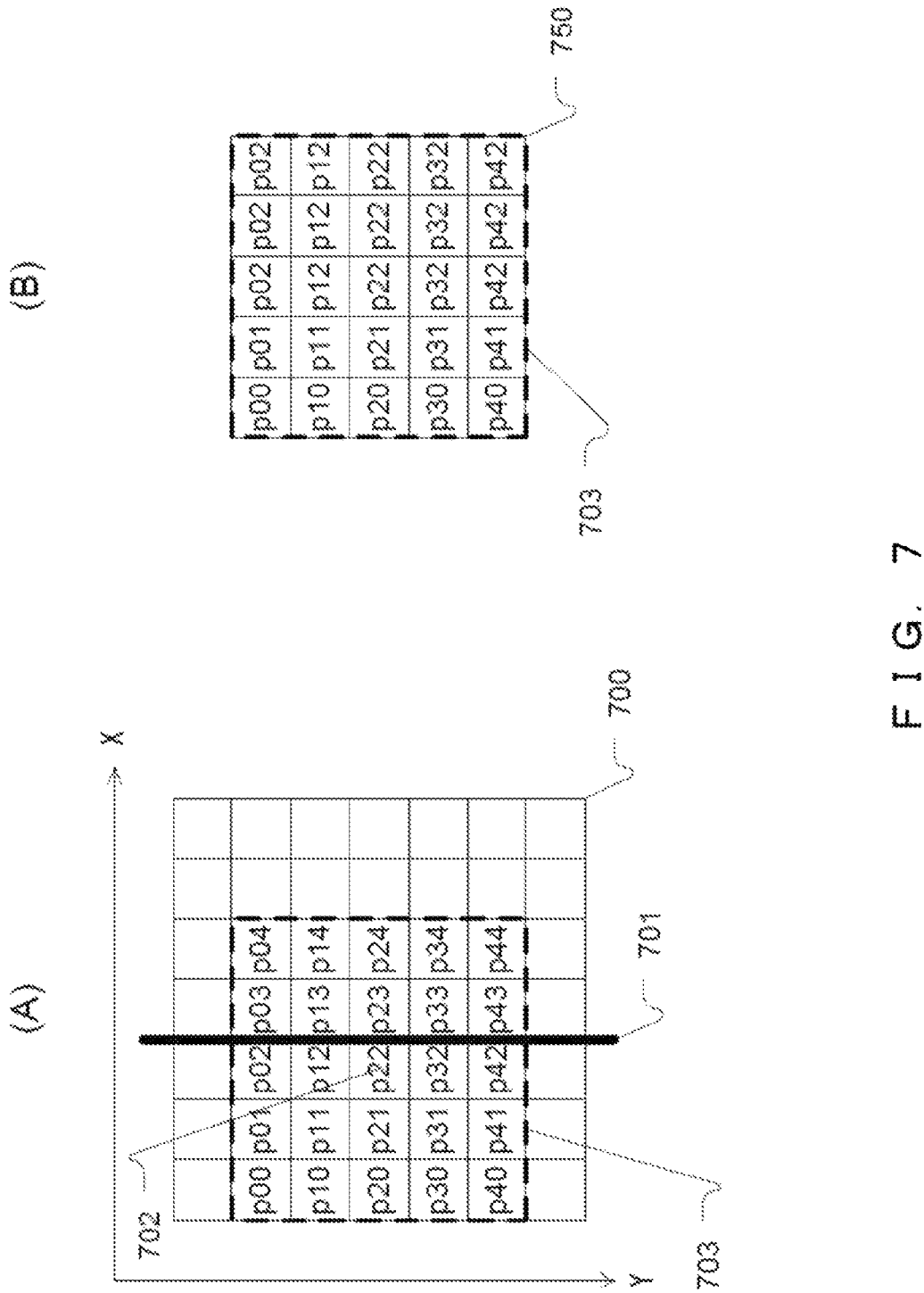
FIG. 7 is an illustration diagram of an adaptive noise removal filter process performed by regarding the small area boundary as the picture boundary, according to an embodiment.

Here, the adaptice noise removal filter process is performed regarding the small area boundary as the picture boundary is explained using FIG. 7.

In FIG. 7, (A) represents the position of the decoded pixel before the adaptive noise removal filter and the small area. Here, the numeral 700 represents the decoded pixel before the adaptive noise removal filter, and p00-p44 represents the pixel value of the corresponding position. In addition, the numeral 702 represents the pixel being the adaptive noise removal filter application target, and the numeral 701 represents the small area boundary. Here, it is assumed that the priority of the small area on the left of the small area boundary 701 is higher than that of the small area on the right of the small area boundary. Meanwhile, the area 703 enclosed by a broken line represents the area of pixels referred to in the adaptive noise removal filter process corresponding to the pixel 702.

In FIG. 7, (B) represents a deemed pixel value referred to in the adaptive noise removal filter process for the pixel 702. Here, the numeral 750 is a deemed pixel value referred to in the adaptive noise removal filter process for the pixel 702. In (B), pixel values p03 and p04 are deemed as a pixel value p02, and the pixel values p13 and p14 of (A) are deemed as a pixel value p12, and pixel values p23 and p24 of (A) are deemed as a pixel value p22, pixel values p33 and p34 of (A) are deemed as a pixel value p32, and pixel values 43 and p44 of (A) are deemed as a pixel value p42.

Next, the reference relation of decoding parameters of adjacent another block in the extension process according to an embodiment is explained below.

The reference relation changes as [4-1] to [4-3] below, depending on the value of TileBoundaryIndependenceIdr.

[4-1] When the value of TileBoundaryIndependenceIdr is "0", the deblocking filter process is performed without reference restriction.

[4-2] When the value of TileBoundaryIndependenceIdr "1", the reference relation is as follows.

First, when the small area to which the block being the extension processing target belongs and the small area to which the adjacent block belong to are different, the adjacent block is treated as being outside the picture. That is, in this case, the deblocking filter process is not applied on the block boundary that is in contact with the small area boundary.

On the other hand, when the small area to which the block being the extension processing target belongs and the small area to which the adjacent block belong to are different are the same, the deblocking filter process is performed without reference restriction.

[4-3] When the value of TileBoundaryIndependenceIdr is "2", the reference relation as follows is applied.

First, when the small area including the extension processing target block is the same as the small area to which the adjacent block belongs to, or when the small area including the extension processing target block has the same priority as the small area to which the adjacent block belongs to, the deblocking filter process is performed without reference restriction.

On the other hand, when the small area including the extension processing target block and the small area to which the adjacent block belongs to are different and they have different priority, only the pixel belonging to the small area with the lower priority is updated by the deblocking filter process.

Figure 8:
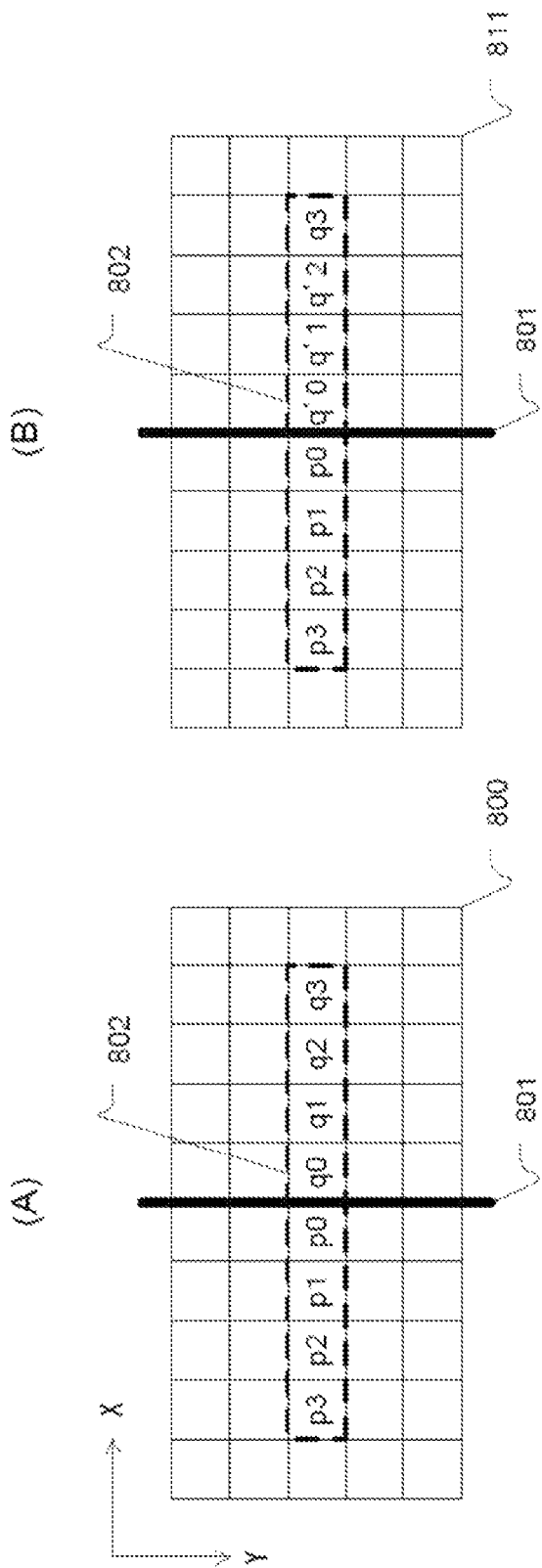
FIG. 8 is an illustration diagram of a deblocking filter process on the small area boundary, according to an embodiment.

The deblocking filter process on the small area boundary is explained using FIG. 8.

In FIG. 8, (A) represents the position of the decoded pixel before the deblocking filter and the small area. Here, the numeral 800 represents the decoded pixel before application of the deblocking filter, 802 represents the pixel referred to in the deblocking filter process application. Meanwhile, the numeral 801 represents the boundary of the small area. Here, it is assumed that the priority of the small area on the left of the small area boundary 801 that includes the pixel before adaptive noise removal filter application is higher than that of the small area on the right of the small area boundary 801.

p3-p0 and q0-q3 represent the pixel value of the corresponding position for each of the pixels 802 referred to in the deblocking filter process application. The deblocking filter process is applied for the left side boundary and the upper side boundary of the block of the process target, p3-p0 are positioned on the adjacent block, and q0-q3 are positioned on the process target block.

In the pixel values 802 referred to in the deblocking filter process application, the value of each pixels p2-p0 and q0-q2 are updated by the deblocking filter process. FIG. 8 (B) represents the pixel value after the deblocking filter process is performed for the pixel values 802.

In (B), the numeral 811 represents the pixel after the deblocking filter process is performed. Since the pixels p2-p0 on the left of the small area boundary 801 are in the small area with a high priority, update of the value by the deblocking filter process is not performed. On the other hand, to the pixels q0-q2 on the right of the small area boundary 801, the deblocking filter process using the value of p3-p0 and q0-q3 is performed, and the value is updated to q'0-q'2.

As described above, on the small area boundary, when the priority of the small area including the block being the process target is higher than the priority of the small area including the adjacent block, the deblocking filter process of the pixel in the adjacent block using the decoding parameter of the adjacent is performed. Meanwhile, the deblocking filter process is not performed for the block being the process target. On the other hand, when the priority of the small area including the block being the extension processing target is lower than the priority of the small area including the adjacent block, the deblocking filter process for the pixel in the extension processing target block using the decoding parameter of the adjacent block is performed. Meanwhile, the deblocking filter process is not performed for the adjacent block.

Next, the specific process procedure of the moving image decoding process according to an embodiment is explained referring to FIG. 9 and FIG. 10.

FIG. 9 and FIG. 10 are flowcharts representing the process details of the moving image decoding process according to an embodiment. The moving image decoding apparatus 100 performs the moving image decoding process for each picture.

Firstly, in step S101, the entropy decoder 110 performs a process to extract the small area information and block processing order information from encoded moving image data. The extracted small area information and the block processing order information are output from the entropy decoder 110 to the small area information extractor 111 and the block processing order information extractor 112 respectively. Upon receiving the extracted small area information, the small area information extractor 111 recovers the position information of each small area and the reference relation information and output to the reference parameter decision unit 113. In addition, upon receiving the block processing order information, the block processing order information extractor 112 decides the extension processing order based on the block processing order information, and outputs information of the decided extension processing order to the reference parameter decision unit 113 and the block extender 115.

After that, in step S102, the entropy decoder 110 performs a judgment process to check whether the entropy decoding of all the blocks in the picture has been completed. When the result of the judgment process is YES, the process moves to step S105, and when it is NO, the process moves to step S103. Meanwhile, the entropy decoder 110 processes the entropy decoding of each block in the order stored in the encoded moving image data.

Next, in step S103, the reference parameter decision unit 113 performs a process to identify the reference relation to the adjacent block of the process block in the entropy decoding, based on the small area in formation and the block processing order information.

Next, in step S104, the entropy decoder 110 performs the next entropy decoding process in the encoded moving image data. Here, only when TileBoundaryIndependenceIdr is 1 and the small area boundary exists between the blocks for which the entropy decoding was performed immediately before and the block to be processed, the rest of the entropy decoding is performed. Meanwhile, it is assumed that, TileBoundaryIndependenceIdr becomes 1 only when the order of the entropy decoding is the sequential scanning order in the small area.

Next, in step S105, the block extender 115 performs a process to identify the block for the next extension process, based on the small area information and the extension processing order.

After that, in step S106, the block extender 115 performs a judgment process to check whether the block for which the next extension process is performed exists in the block compression information storage buffer 114. When it is determined that the block exists, in the judgment process, the process moves to S107. On the other hand, when it is determined that the block does not exist, the process moves to S102.

Next, in step S107, the reference parameter decision unit 113 performs a process to identify the reference relation in the extension process, based on the small area information.

Next, in step S108, the block extender 115 performs the extension process of each block. The details of the extension process are explained later using FIG. 10.

After that, in step S109, the block extender 115 performs a process to check whether the extension process of all the blocks has been completed. If the result of the judgment process YES, the process moves to S110, and when it is NO, the process moves to S106.

Next, in step S110, the block extender 115 performs the adaptive pixel offset process using the reference relation to the adjacent block identified by the process in step S107.

Next, in step S111, the block extender 115 performs the adaptive noise removal filter process using the reference relation to the adjacent block identified in step S107. Then the process of step S111 is completed, the moving image decoding process for each picture is finished Next, the details of the extension process in units of blocks are explained with reference to the flowchart in FIG. 10.

First, in step S201, the block extender 115 performs a process to obtain the decoding parameter of the adjacent block from the frame memory, based on the reference relation to the adjacent block.

Next, in step S202, the block extender 115 performs a process to recover the decoding parameters except the pixel value of the extension process block.

After that, in step S203, the block extender 115 performs a judgment process to check the prediction encoding mode of the extension process block. When the prediction encoding mode is determined as the intra prediction encoding mode, the process moves to step S204, and when the prediction encoding mode is determined as the inter prediction encoding mode, the process moves to step S206.

In step S204, the block extender 115 performs a process to obtain an intra prediction reference pixel using only the decoded pixel values to which reference is allowed. Here, when reference to the decoded pixel value of the upper side and left side adjacent blocks is permitted, the decoded pixel value becomes intra prediction reference pixel without change.

Next, in step S205, the block extender 115 performs a process to generate a predicted pixel (intra prediction pixel) in the intra prediction encoding. After the completion of the step S205, the process moves to step S207.

Meanwhile, in step S206, the block extender 115 performs a process to generate a prediction pixel (inter prediction pixel) in the inter prediction encoding, using the motion vector information decoded in S202.

Next, in step S207, the block extender 115 performs a process to recover the prediction error of each pixel by reverse quantization and inverse orthogonal transform of the quantization coefficient.

Next, in step S208, the block extender 115 performs a process to recover the pixel value by adding the prediction error of each pixel to the value of the corresponding pixel of the prediction image.

Next, in step S209, the block extender 115 performs the deblocking filter process using only the decoded pixel value to which reference is permitted, from the upper side and left side adjacent block of the processing block. When the process in the step S209 is completed, the extension process in units of blocks illustrated in FIG. 10 is completed, and the process moves to S109 in FIG. 9.

Meanwhile, in the encoded moving image data, a flag AmvpTemporalFlag that controls whether or not to perform the prediction process of the motion vector in the time direction may be inserted. In such a case, the block extender 115 of the moving image decoding apparatus 100 is configured to perform the prediction process of the motion vector in the time direction only when the value of the flag is "1".

AmvpTemporalFlag is added to each picture. For example, in the case of the encoding method described in Document 6 mentioned above, the flag is described in the slice header. In addition, the value of AmvpTemporalFlag is set to "0" in the refresh picture, and set to "1" in other pictures, when the encoded moving image data is encoded moving image data in the intra slice method descried above. Accordingly, the motion vector information is decoded in the normal way in all the blocks in all the pictures.

Meanwhile, when using AmvpTemporalFlag and the value of TileBoundaryIndependenceIdr in the decoding parameters in adjacent another block referred to in the extension process is "2", the motion vector information is configured to be handled as the second parameter group.

In addition, in the data type in the data 311-315 in FIG. 5, TileBoundaryIndependenceIdr and ProcessingOrderIdx may be as follows.

TBII (TileBoundaryIndependenceIdr.) is an example of dependency information representing the dependency of the block regarding the first decoding parameter and the second decoding parameter. This value being "0" indicates "the presence of dependency" of the corresponding decoding parameter, meaning that reference to all the adjacent small areas is valid in the entropy decoding process and the extension process. In addition, the value being "1" indicates "the presence of one direction dependency" of the corresponding decoding parameter. This means that, corresponding to the value of ProcessingOrderIdx, reference to all the adjacent small areas is invalid for both or one of the entropy decoding process and the extension process.

POI (ProcessingOrderIdx.) is an index that indicates the scanning order in the entropy decoding process and the extension process. The value being "0" means that both the entropy decoding process and the extension process are in the sequential scanning order in the small area. Meanwhile, the processing order of each small area in this case becomes the sequential scanning order in the picture. Meanwhile, the value being "1" means that the entropy decoding process is in the sequential scanning order in the picture, and the extension process is in the sequential scanning order in the small area.

When the definition is made as described above, the reference relation in the entropy decoding and extension processing in the case of the value of TileBoundaryIndependenceIdr is as follow. That is, when the value of ProcessingOrderIdx is "0", in the entropy decoding process and the extension process, reference to all the adjacent small areas is invalid. Meanwhile, when the value of ProcessingOrderIdx is "1", in the extension process, reference to all the adjacent small areas is invalid, while in the entropy decoding process, reference to all the adjacent small area is valid.

Meanwhile, when the definition is made as described above, TileIdxDiff is not used.

Next, with reference to the drawing, the moving image encoding apparatus according to an embodiment is explained. The moving image encoding image divides and encodes a picture into two ore more small areas that do not overlap with each other and includes at least one block, to generate encoded moving image data.

Figure 11:
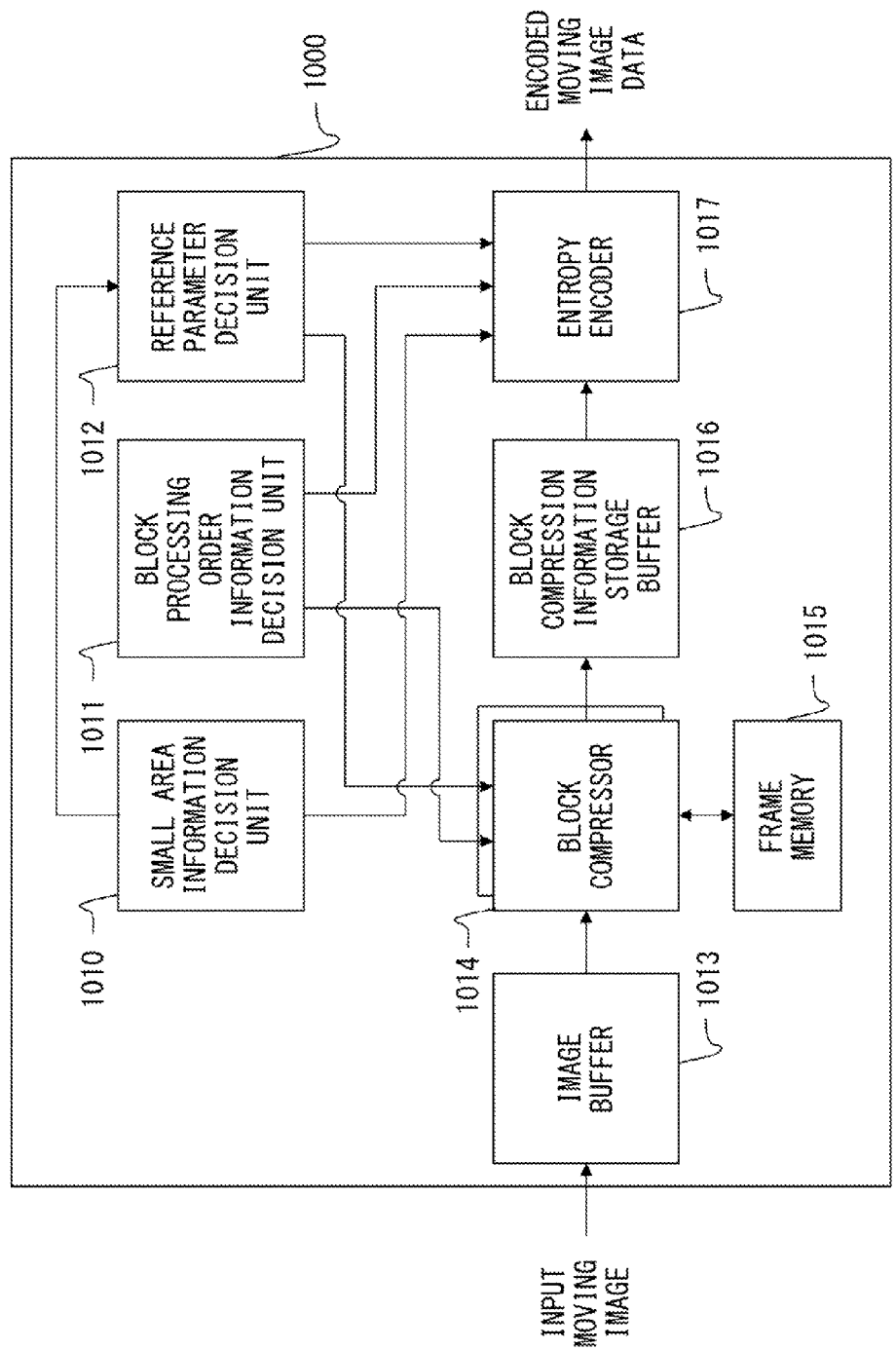
FIG. 11 is an outline configuration diagram of a moving image encoding apparatus according to an embodiment.

FIG. 11 is an outline configuration diagram of a moving image encoding apparatus according to an embodiment.

A moving image encoding apparatus 1000 performs a compression encoding to an input moving image, and outputs encoded moving image data. Meanwhile, the moving image decoding apparatus 100 in FIG. 3 decodes the encoded moving image data that the moving image encoding apparatus 1000 outputs, and outputs a decoded moving image.

The moving image encoding apparatus 1000 has a small area information decision unit 1010, a block processing order information decision unit 1011, a reference parameter decision unit 1012, a image buffer 1013, a block compressor 1014, a frame memory 1015, a block compression information storage buffer 1016, and an entropy encoder 1017.

The small area information decision unit 1010 decides, as the small area information, the information of the small area explained using FIG. 5, that is, the position information of each small area in the picture (first small area information) and the reference relation information to another small area adjacent to each small area (second small area information). These pieces of small area information are decided based on the configuration of the moving image encoding apparatus 1000, or the encoding method. For example, when the block compressor 1014 of the moving image encoding apparatus 1000 consists of four compression engines and the respective compression engines operates in parallel, the picture is divided into four rectangular small areas having the same area, and reference between the respective small areas is invalid in the compression process. In addition, when the encoding in the intra slice method is realized, the picture is divided into two rectangular small areas, and the shift of the boundary position between the two for each picture is performed. In addition, reference from a rectangular small area corresponding to the clean area to another rectangular small area corresponding to the non-clean area in the compression process is invalid.

The decided position information of each small area and the reference relation information to adjacent another small area are output from the small area information decision unit 1010 to the reference parameter decision unit 1012 and the entropy encoder 1017.

The block processing order information decision unit 1011 decides the order of compression process of each block and the order of the entropy encoding. These pieces of information area decided according to the encoding method. For example, when reducing the delay in the entropy encoding, the compression process order of the block is decided as the sequential scanning order in the small area, and the compression process order of the entropy encoding is decided as the sequential scanning order in the picture.

Information of the decided compression processing order is output from the decision unit 1011 to the block compressor 1014 and the entropy encoder 1017. Meanwhile, to the entropy encoder 1017, the block processing order information decision unit 1011 also outputs information of the decided entropy encoding order.

The reference parameter decision unit 1012 decides the first decoding parameter and the second decoding parameter of adjacent another block referred to in the compression process and the entropy encoding process of each block, based on the small area information received from the small area information decision unit 1010. The decided first decoding parameter is output from the reference parameter decision unit 1012 to the entropy encoder 1017, and the decided second decoding parameter is output from the reference parameter decision unit 1012 to the block compressor 1014.

The image buffer 1013 buffers the moving image output in the sequential scanning order of the picture.

The block compressor 1014 performs the compression process of one or more blocks. In the moving image encoding apparatus 1000, one or more block compressor 1014 exist.

The block compressor 1014 has a prediction error generation circuit, quantitative DCT coefficient generation circuit, prediction error pixel recovery circuit, prediction pixel generation circuit, local decoded pixel generation circuit, in-loop post filter circuit, and the motion search circuit, while these circuits are not particularly illustrated in the drawing. Meanwhile, the prediction error generation circuit is a circuit that performs the differential calculation between each pixel in the encoding target block and the intra prediction pixel value or the inter prediction pixel value to generate the prediction error. The quantitative DCT coefficient generation circuit is a circuit that performs orthogonal transform and quantization to the prediction error to generate the quantization DCT coefficient. The prediction error pixel recovery circuit is a circuit that performs inverse quantization/inverse orthogonal transform to the quantization DCT coefficient to recover the prediction error pixel. The prediction pixel generation circuit is a circuit that generates the intra prediction pixel or the inter prediction pixel from the local decoded pixel stored in the frame memory. The local decoded pixel generation circuit is a circuit that adds the prediction error pixel and the prediction pixel to generate a local decoded pixel. The in-loop post filter circuit is a circuit that applies the three types of in-loop post filters, that is, the deblocking filter, adaptive pixel offset, and the adaptive noise removal filter sequentially to generate the final local decoded pixel. Then, the motion search circuit is a circuit that generates the motion vector used for inter prediction using the input image and the local decoded pixel in the reference picture. Meanwhile, the local decoded pixel is output from the block compressor 1014 to the frame memory 1015.

The block compressor 1014 receives information of the second decoding parameter to refer to from the reference parameter decision unit 1012, and performs the compression process using only the corresponding decoding parameter of adjacent another block when compressing block data. Compression information such as the quantization DCT coefficient and motion vector and the like are output from the block compressor 1014 to the block compression information storage buffer 1016.

Meanwhile, the order of the compression process of each block performed by the block compressor 1014 is switched according to information of the compression processing order received from the block processing order information decision unit 1011.

The frame memory 1015 receives and stores the local decoded pixel immediately after adding the prediction error pixel to the prediction pixel, and the local decoded pixels to which each of the three post filters has been applied, from the block compressor 1014. Meanwhile, in these local decoded pixels, the local decoded pixel to which the adaptive noise removal filter has been applied becomes the final local decoded pixel. In addition, the frame memory 1015 outputs, to the block compressor 1014, the local decoded pixel immediately after adding the prediction error pixel and the prediction pixel, and the local decoded pixels to which each of the three post filters has been applied.

The block compression information storage buffer 1016 is used in a case in which the compression process of each block in the block compressor 1014 and the entropy encoding process of each block in the entropy encoder 1017 is not in synchronization. Such a case is, for example, when the value of ProcessingOrderIdx described above is "1". In this case, compression information of the block for which block compression is performed earlier in the block compressor 1014 is buffered and stored temporarily.

The entropy encoder 1017 performs the entropy encoding process according to a predetermined entropy encoding method, to the compression information of the block output from the information storage buffer 1016 to generate encoded moving image data. Meanwhile, as the predetermined entropy encoding method, for example, the Huffman encoding method or an arithmetic encoding method (for example, CABAC: Context-based Adaptive Binary Arithmetic Coding) may be used.

Meanwhile, the entropy encoder 1017 receives information of the first decoding parameter to refer to from the reference parameter decision unit 1012, and performs the entropy encoding process using only the corresponding decoding parameter of adjacent another block, when performing the entropy encoding of block data. In addition, entropy encoder 1017 embeds, into the generated encoded moving image data, small area information output from the small area information decision unit 1010 and block processing order information output from the block processing order information decision unit 1011. These pieces of embedded information are the data 311-315 illustrated in FIG. 5.

Meanwhile, the order of the entropy encoding process performed by the entropy encoder 1017 is switched according to information of the entropy encoding order received from the block processing order information decision unit 1011.

Next, specific process details of the moving image encoding process according to an embodiment is explained with reference to FIG. 12 and FIG. 13.

Figure 12:
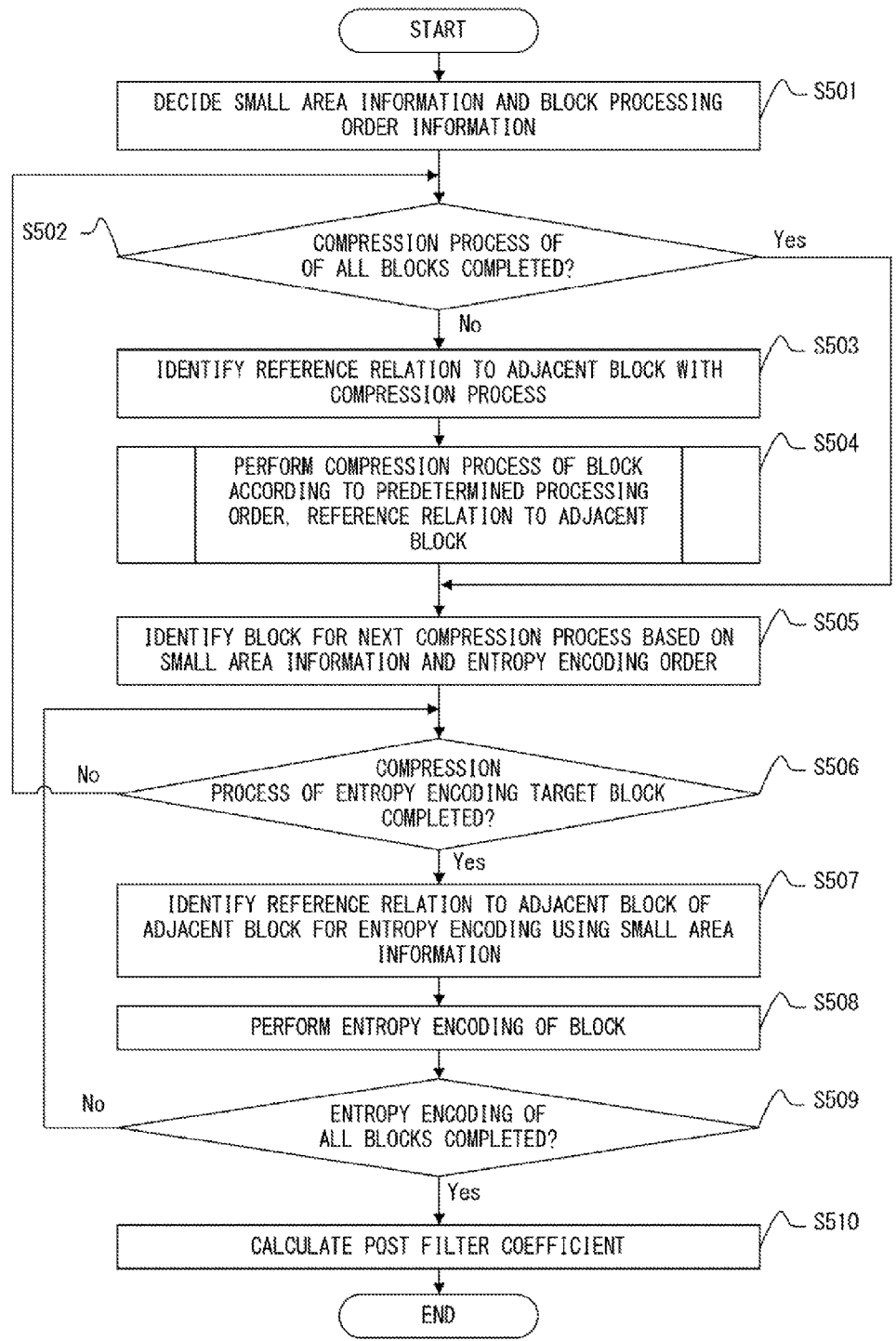
FIG. 12 is a flowchart (part 1) presenting the process detail of a moving image encoding process according to an embodiment.
Figure 13:
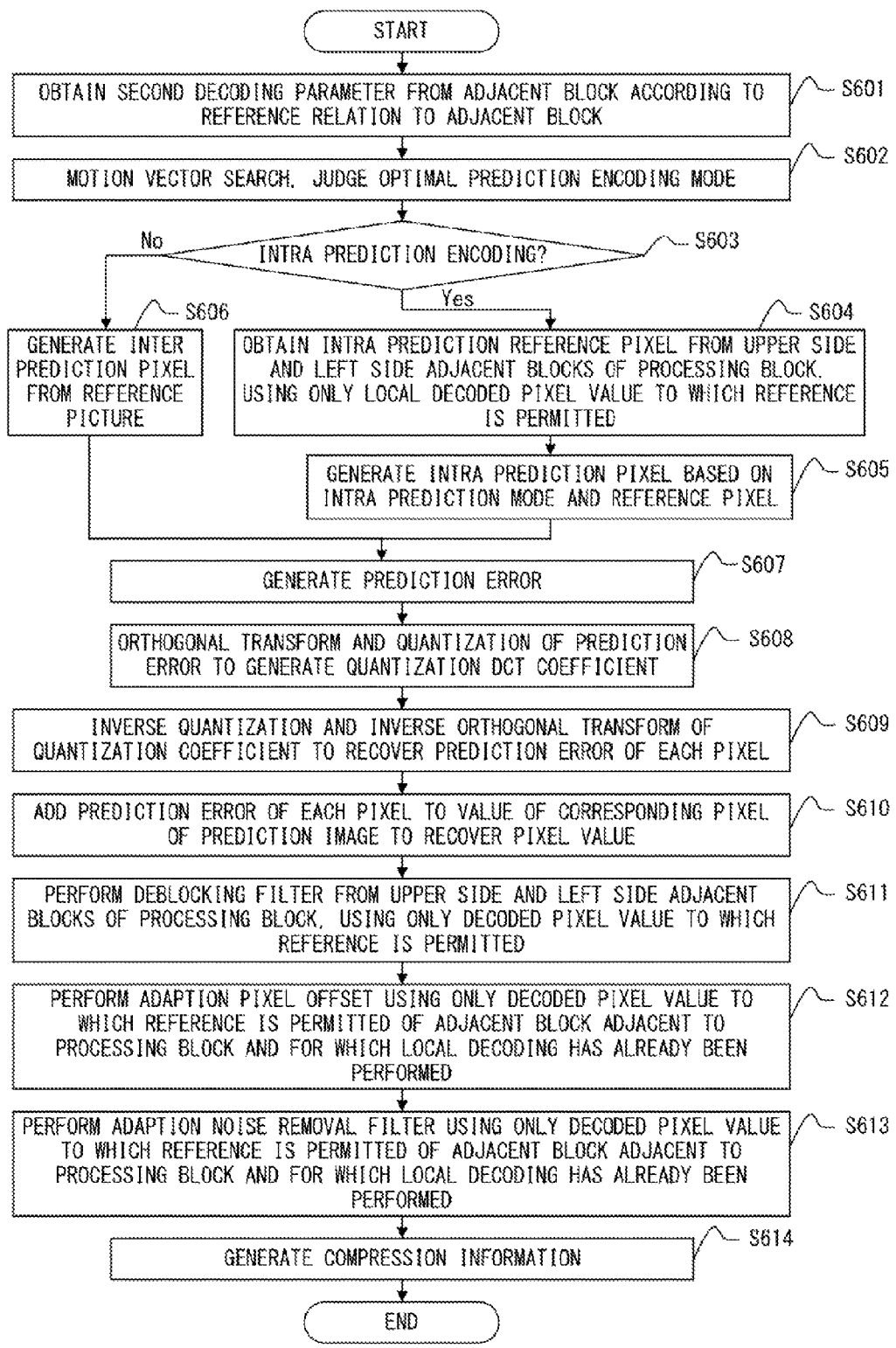
FIG. 13 is a flowchart (part 2) presenting the process detail of a moving image encoding process according to an embodiment.

FIG. 12 and FIG. 13 are flowcharts representing the process details of the moving image encoding process according to an embodiment. Moving image encoding apparatus 1000 performs the moving image encoding process for each picture.

Firstly, in step S501, the small area information decision unit 1010 performs a process to decide the small area information, and also the block processing order information decision unit 1011 performs a process to decide the compression processing order and the entropy encoding order of each block. The small area information decided by the small area information decision unit 1010 and the block processing order information decided by the block processing order information decision unit 1011 are output from the small area information decision unit 1010 to the reference parameter decision unit 1012 and the entropy encoder 1017. Upon receiving these pieces of information, the entropy encoder 1017 performs a process to embed the received small area information and the block processing order information into encoded moving image data.

Next, in step S502, the block compressor 1014 performs a judgment process to check whether the compression process of all the blocks in the picture has been completed. When the result of the judgment process is YES, the process moves to step S505, and when it is NO, the process moves to S503. In step S503, the reference parameter decision unit 1012 performs a process to identify reference relation to the adjacent block of the processing block in the compression process.

Next, in step S504, the block compressor 1014 performs the compression process of each block, according to the compression processing order decided by the block processing order information decision unit 1011 and the reference relation to the adjacent block identified by the process in S503. The details of the block compression process are described later using FIG. 13.

Next, in step S505, the entropy encoder 1017 performs a process to identify a block for which the next entropy encoding is performed, according to the small area information and the entropy encoding order of each block decided by the block processing order information decision unit 1011.

After that, in step S506, the entropy encoder 1017 performs a judgment process to check whether the block for which the next entropy encoding is performed exists in the block compression information storage buffer 1016. When it is determined in the judgment process that the block exists, the process moves to S507. On the other hand, when it is determined that the block does not exist, the process moves to S502.

In step S507, the reference parameter decision unit 1012 performs a process to identify the reference relation to the adjacent block of the processing block in the entropy encoding, from the small area information and the block processing order information received from the small area information decision unit 1010.

Next, in step S508, the entropy encoder 1017 performs the entropy encoding process of each block, according to a predetermined entropy encoding method. Here, only when TileBoundaryIndependenceIdr is 1 and the small area boundary exists between the block for which entropy encoding was performed immediately before and the block to be processed, the reset of the entropy encoding is performed. Meanwhile, it is assumed that TileBoundaryIndependenceIdr becomes 1 only when the order of the entropy encoding is the sequential scanning order in the small area.

After that, in step S509, the entropy encoder 1017 performs a judgment process to check whether the entropy encoding process of all the blocks has been completed. When the result of the judgment process is YES, the process moves to S510, and when it is NO, the process moves to step S506.

In step S510, the block compressor 1014 performs a process to calculate the parameter of the adaptive pixel offset and the adaptive noise removal filter from the input image and the local decoded pixel value. The parameter is applied to the picture encoded next. Meanwhile, in the first picture, as the parameter, an initial value decided in advance is used.

When the process in step S510 is completed, the moving image encoding process for each picture is completed.

Next, the details of the compression process in units of blocks being the process in step S504 in FIG. 12 is explained with reference to the flowchart in FIG. 13.

Firstly, in step S601, the block compressor 1014 performs a process to obtain the decoding parameter of the adjacent block from the frame memory 1015, according to the reference relation to the adjacent block.

Next, in step S602, the block compressor 1014 performs a process to perform motion vector search to obtain optimal motion vector, and to decide the optimal prediction encoding mode. The decision is performed by comparing the encoding cost at the time of intra prediction and the encoding cost at the time of inter prediction, and deciding the one with the smaller cost as the optimal encoding mode for the processing block.

After that, in step S603, the block compressor 1014 performs a process to judge whether or not the decided encoding mode is an intra prediction encoding mode. Here, when it is determined that the decided encoding mode is the intra prediction encoding mode, the process moves to step S604. On the other hand, when it is determined that the decided encoding mode is not the intra prediction encoding mode (and is the inter prediction encoding mode), the process moves to step S606.

Next, in step S604, the block compressor 1014 performs a process to obtain the intra prediction reference pixel from the upper side and left side adjacent block of the compression processing block, using only the local decoded pixel value to which reference is permitted. Here, when reference to the local decoded pixel value of the upper side and the left side adjacent block is permitted, the local decoded pixel value becomes the intra prediction reference pixel without change.

Next, in step S605, the block compressor 1014 performs a process to generate a prediction pixel (intra prediction pixel) in the intra prediction encoding, using the intra prediction reference pixel obtained in S604. After the completion of the process in S605, the process moves to step S607.

In step S606, the block compressor 1014 performs a process to generate a prediction pixel (inter prediction pixel) in the inter prediction encoding, using the decoded motion vector information obtained in the process in step S602.

Next, in step S607, the block compressor 1014 performs a process to generate the prediction error. This prediction error is generated by subtracting, from the pixel value of the block being the processing target, the pixel value of the intra prediction pixel generate by the process in step S605, or, the inter prediction pixel generated by the process in step S606.

Next, in step S608, the block compressor 1014 performs a process to perform orthogonal transform and quantization to the prediction error generated by the process in step S607, to generate the quantization DCT coefficient.

Next, in step S609, the block compressor 1014 performs a process to perform inverse quantization and inverse orthogonal transform to the quantization DCT coefficient generated by the process in step S608, to recover the prediction error of each pixel.

Next, in step S610, the block compressor 1014 performs a process to add the prediction error of each pixel recovered by the process in step S609 to the value of the corresponding pixel of the prediction image, to recover the pixel value.

Next, in step S611, the block compressor 1014 performs a process to perform the deblocking filter process, to the processing block, from its upper side and left side adjacent blocks, using only the local decoded pixel value to which reference is permitted.

Next, in step S612, the block compressor 1014 performs the adaptive pixel offset process using only the local decoded pixel value after the deblocking filter to which reference is permitted, in the block adjacent to the processing block and for which local decoding has already been performed. Meanwhile, the parameter used for the adaptive pixel offset is calculated from the process in S510 in FIG. 12.

Next, in step S613, the block compressor 1014 performs the adaptive noised removal filter process using only the local decoded pixel value after the adaptive pixel offset to which reference is permitted, in the block adjacent to the processing block and for which local decoding has already been performed. Meanwhile, the parameter used for the adaptive noise removal filter is also calculated from the process in S510 in FIG. 12.

Next, in step S614, the block compressor 1014 performs a process to output the encoded parameter of the quantization DCT coefficient and the motion vector and the like as the compression information. Meanwhile, for the moving vector in the encoding parameters, the difference over the predicted value of the motion vector is the compression information.

When the process in step S614 is completed, the compression process in units of blocks illustrated in FIG. 13 is finished, and the process moves to S505 in FIG. 12 after that.

Meanwhile, the computer program that realizes the function of each elements of the moving image decoding apparatus or the moving image encoding apparatus according to the embodiments described above or their modification examples may be recorded in a recording medium such as a semiconductor memory or an optical recording medium and distributed.

The moving image decoding apparatus or the moving image encoding apparatus according to the embodiments described above or their modification examples is used for various purposes.

For example, the moving image decoding apparatus or the moving image encoding apparatus is embedded into a video camera, a video image transmission apparatus, a video image reception apparatus, a television telephone system, a computer or a mobile phone.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A moving image decoding apparatus decoding encoded moving image data in which a picture is divided and encoded, into two or more small areas that include at least a block and do not overlap with each other, the moving image decoding apparatus comprising:
   a small area information extractor configured to extract small area information, from the encoded moving image data, small area information including position information of each small area and reference relation information to another small area;
   a block processing order information extractor configured to extract, from the encoded moving image data, block processing order information representing an order of an entropy decoding process of each block in the picture and an extension process of each block in the picture;
   a reference parameter decision unit configured to decide a decoding parameter of another block for which decoding has already been done in the same picture, being a first decoding parameter referred to when the entropy decoding process of each block in the picture is performed, and
   a decoding parameter of another block for which decoding has already been done in the same picture, being a second decoding parameter referred to when the extension process of each block in the picture is performed, using the small area information;
   an entropy decoder configured to generate compression information of each block in the picture by performing the entropy decoding process of each block in the picture, to the encoded moving image data, in an order according to the block processing order information, by referring only to the first decoding parameter; and
   a block extender configured to generate a decoding parameter of each block in the picture by performing the extension process of each block in the picture, to the encoded moving image data, in an order according to the block processing order information, by referring only to the second decoding parameter in the compression information of each block in the picture,
   wherein the block processing order information indicates, for each of the entropy decoding process and the extension processing, either one of a sequential scanning order in the picture and a sequential scanning order in the small area, and
   when the block processing order information indicates the sequential scanning order in the picture as the order of the entropy decoding process, in the entropy decoding process, a reset process on a small area boundary is not performed, and
   a decoding parameter for a block in a different small area in the first parameter is referred to.

2. The moving image decoding apparatus according to claim 1, wherein:
   the reference relation information to another small area includes dependency information indicating dependency of a block regarding the first decoding parameter and the second decoding parameter and priority information representing priority among each of the blocks;
   when the dependency information indicates "absence of dependency" of a corresponding parameter, the first decoding parameter and the second decoding parameter regarding a block being a processing target of each of the entropy decoding process and the extension process are the first decoding parameter and the second decoding parameter of all adjacent blocks;
   when the dependency information indicates "absence of bidirectional dependency" of a corresponding parameter, the first decoding parameter and the second decoding parameter regarding a block being a processing target of each of the entropy decoding process and the extension process are the first decoding parameter and the second decoding parameter of all adjacent blocks included in the same small area as the small area including the block being the processing target; and when the dependency information indicates "presence of one direction dependency" of the corresponding decoding parameter, the first decoding parameter and the second decoding parameter regarding a block being a processing target of each of the entropy decoding process and the extension process are the first decoding parameter of all adjacent blocks, and the second decoding parameter of all adjacent blocks for which the priority information indicates as being included in a small area having higher or same priority as the small area including the block being the processing target.

3. The moving image decoding apparatus according to claim 2, wherein the second decoding parameter includes intra prediction direction information and quantization scale information, and when the dependency information indicates "presence of one direction" of the second decoding parameter, recovery intra prediction direction and quantization scale information in the second decoding parameters of the block being the processing target in the extension process are the recovery intra prediction direction and quantization scale information of all adjacent blocks.

4. The moving image decoding apparatus according to claim 2, wherein:

the second decoding parameter includes motion vector information;

to the encoded moving image data, a motion vector time direction reference flag indicating whether or not to use motion vector of inter prediction reference picture in an extension process of the motion vector information is added; and when the dependency information indicates "presence of one direction" of the second decoding parameter, the motion vector information in the second decoding parameters of the block being the processing target in the extension process is the motion vector information of all adjacent blocks.

5. The moving image decoding apparatus according to claim 2, wherein when the dependency information indicates "presence of one direction" of the second decoding parameter and priority of the small area including the block being the processing target in the extension process is higher than priority of a small area including an adjacent block, a deblocking filter process of a pixel in the adjacent block is performed using the second decoding parameter of the adjacent block, but the deblocking filter process is not performed for the block being the processing target, and when the dependency information indicates "presence of one direction" of the second decoding parameter and priority of the small area including the block being the processing target in the extension process is lower than priority of a small area including an adjacent block, the deblocking filter process of a pixel in the block being the processing target is performed using the second decoding parameter of the adjacent block, but the deblocking filter process is not performed for the adjacent block.

6. A moving image encoding apparatus generating an encoded moving image data by dividing and encoding a picture into two or more small areas that that include at least a block and do not overlap with each other, the moving image encoding apparatus comprising:

a small area information decision unit configured to decide small area information including position information and reference relation information to another small area, the small area information being inserted into the encoded moving image data;

a block processing order information decision unit configured to decide block processing order information being information representing an order of an entropy encoding process of each block in the picture and a compression process of each I0 block in the picture and being information inserted into the encoded moving image data;

a reference parameter decision unit configured to decide, using the small area information, a local decoding parameter of another block for which entropy encoding has already been performed in the same picture being a first decoding parameter referred to when the entropy encoding process of each block in each picture is performed, and a local decoding parameter of another block for which local decoding has already been processed in the same picture being a second decoding parameter referred to when the compression process of each block in the picture is performed;

a block compressor configured to generate compression information of each block in the picture by performing the compression process to each block in the picture in an order 25 according to the block processing order information by referring only to the second decoding parameter; and an entropy encoder configured to generate an encoded data of each block in the picture by performing the entropy encoding process to the compression information of each block in the picture in an order according to the block processing order information by referring only to the first decoding parameter, wherein the block processing order information indicates, for each of the entropy encoding process and the compression process, either one of a sequential scanning order in the picture and a sequential scanning order in the small area, and when the block processing order information indicates the sequential scanning order in the picture as the order of the entropy encoding process, a reset process is not performed on a small area boundary in the entropy encoding process, and the decoding parameter of a different small area in the first parameter is referred to.

7. The moving image encoding apparatus according to claim 6, wherein:

the reference relation information to another small area includes dependency information indicating dependency of a block regarding the first decoding parameter and the second decoding parameter and priority information representing priority among each of the blocks;

when the dependency information indicates "absence of dependency" of a corresponding parameter, the first decoding parameter and the second decoding parameter regarding a block being a processing target of each of the entropy decoding process and the extension process are the first decoding parameter and the second decoding parameter of all adjacent blocks;

when the dependency information indicates "absence of bidirectional dependency" of a corresponding parameter, the first decoding parameter and the second decoding parameter regarding a block being a processing target of each of the entropy encoding process and the compression process are the first decoding parameter and the second decoding parameter of all adjacent blocks included in the same small area as the small area including the block being the processing target; and when the dependency information indicates "presence of one direction dependency" of the corresponding decoding parameter, the first decoding parameter and the second decoding parameter regarding a block being a processing target of each of the entropy encoding process and the extension process are the first decoding parameter of all adjacent blocks, and the second decoding parameter of all adjacent blocks for which the priority information indicates as being included in a small area having higher or same priority as the small area including the block being the processing target.

8. The moving image encoding apparatus according to claim 7, wherein the second decoding parameter includes intra prediction direction information and quantization scale information, and when the dependency information indicates "presence of one direction" of the second decoding parameter, recovery intra prediction direction and quantization scale information in the second decoding parameters of the block being the processing target in the compression process are the recovery intra prediction direction and quantization scale information of all adjacent blocks.

9. The moving image encoding apparatus according to claim 7, wherein:

the second decoding parameter includes motion vector information; to the encoded moving image data, a motion vector time direction reference flag indicating whether or not to use motion vector of inter prediction reference picture in a compression process of the motion vector information is added; and when the dependency information indicates "presence of one direction" of the second decoding parameter, the motion vector information in the second decoding parameters of the block being the processing target in the compression process is the motion vector information of all adjacent blocks.

10. The moving image encoding apparatus according to claim 7, wherein when the dependency information indicates "presence of one direction" of the second decoding parameter and priority of the small area including the block being the processing target in the compression process is higher than priority of a small area including an adjacent block, a deblocking filter process of a pixel in the adjacent block is performed using the second decoding parameter of the adjacent block, but the deblocking filter process is not performed for the block being the processing target, and when the dependency information indicates "presence of one direction" of the second decoding parameter and priority of the small area including the block being the processing target in the compression process is lower than priority of a small area including an adjacent block, the deblocking filter process of a pixel in the block being the processing target is performed using the second decoding parameter of the adjacent block, but the deblocking filter process is not performed for the adjacent block.

11. A moving image decoding method decoding encoded moving image data in which a picture is divided and encoded, into two or more small areas that include at least a block and do not overlap with each other, the moving image decoding method comprising:

extracting small area information, from the encoded moving image data, small area information including position information of each small area and reference relation information to another small area;

extracting, from the encoded moving image data, block processing order information representing an order of an entropy decoding process of each block in the picture and an extension process of each block in the picture;

deciding a decoding parameter of another block for which decoding has already been done in the same picture, being a first decoding parameter referred to when the entropy decoding process of each block in the picture is performed, and a decoding parameter of another block for which decoding has already been done in the same picture, being a second decoding parameter referred to when the extension process of each block in the picture is performed, using the small area information;

generating compression information of each block in the picture by performing the entropy decoding process of each block in the picture, to the encoded moving image data, in an order according to the block processing order information, by referring only to the first decoding parameter; and generating a decoding parameter of each block in the picture by performing the extension process of each block in the picture, to the encoded moving image data, in an order according to the block processing order information, by referring only to the second decoding parameter in the compression information of each block in the picture, wherein when the block processing order information indicates a sequential scanning order in the picture as an order of the entropy decoding process of each block in the picture, in the entropy decoding process, a reset of entropy encoding on a small area boundary is not performed, and a decoding parameter for a block in a different small area in the first parameter is referred to.

12. A moving image encoding method generating an encoded moving image data by dividing and encoding a picture into two or more small areas that that include at least a block and do not overlap with each other, the moving image encoding method including:

deciding small area information including position information and reference relation information to another small area, the small area information being inserted into the encoded moving image data;

deciding block processing order information being information representing an order of an entropy encoding process of each block in the picture and a compression process of each block in the picture and being information inserted into the encoded moving image data;

deciding, using the small area information, a local decoding parameter of another block for which entropy encoding has already been performed in the same picture being a first decoding parameter referred to when the entropy encoding process of each block in each picture is performed, and a local decoding parameter of another block for which local decoding has already been processed in the same picture being a second decoding parameter referred to when the compression process of each block in the picture is performed;

generating compression information of each block in the picture by performing the compression process to each block in the picture in an order according to the block processing order information by referring only to the second decoding parameter; and generating an encoded data of each block in the picture by performing the entropy encoding process to the compression information of each block in the picture in an order according to the block processing order information by referring only to the first decoding parameter, wherein when the block processing order information indicates a sequential scanning order in the picture as an order of the entropy encoding process of each block in the picture, a reset process is not performed on a small area boundary in the entropy encoding process, and the decoding parameter of a different small area in the first parameter is referred to.

* * * * *